United States Patent [19]

Hara et al.

[11] Patent Number: 5,638,795
[45] Date of Patent: Jun. 17, 1997

[54] CONTROL SYSTEM FOR INTERNAL COMBUSTION ENGINES

[75] Inventors: Fumio Hara; Akira Fujimura; Yoshihisa Hara; Masahiro Sakanushi, all of Wako, Japan

[73] Assignee: Honda Giken Kogyo Kabushiki Kaisha, Tokyo, Japan

[21] Appl. No.: 654,380

[22] Filed: May 28, 1996

Related U.S. Application Data

[62] Division of Ser. No. 526,563, Sep. 12, 1995, Pat. No. 5,546,922, which is a division of Ser. No. 187,469, Jan. 28, 1994, Pat. No. 5,469,833.

[30] Foreign Application Priority Data

Feb. 1, 1993 [JP] Japan ......................... 5-36094

[51] Int. Cl.$^6$ ..................................... F02M 25/08
[52] U.S. Cl. ............................................. 123/520
[58] Field of Search ..................... 123/518, 519, 123/520, 698

[56] References Cited

U.S. PATENT DOCUMENTS

| | | | |
|---|---|---|---|
| 4,377,142 | 3/1983 | Otsuka et al. | 123/520 X |
| 5,188,085 | 2/1993 | Habaguchi et al. | 123/520 |
| 5,216,995 | 6/1993 | Hosoda et al. | 123/520 |
| 5,216,997 | 6/1993 | Osanai et al. | 123/520 X |
| 5,381,776 | 1/1995 | Matsubara et al. | 123/681 |
| 5,406,927 | 4/1995 | Kato et al. | 123/698 X |
| 5,419,302 | 5/1995 | Abe | 123/674 |

FOREIGN PATENT DOCUMENTS 63-57841  3/1988  Japan.

*Primary Examiner*—Tony M. Argenbright
*Attorney, Agent, or Firm*—Nikaido Marmelstein Murray & Oram LLP

[57] ABSTRACT

A control system for an internal combustion engine controls a fuel injection amount based on operating conditions of the engine and an evaporative fuel concentration-dependent correction coefficient. The control system includes a purge control valve arranged in a purging passage connecting a canister for temporarily storing evaporative fuel generated from a fuel tank and an intake passage. This coefficient is held to a predetermined value for a predetermined time period after purging is permitted, and to another for a predetermined time period after purging is inhibited. In another aspect, the purge control valve is controlled based on operating conditions of the engine and a purging flow rate correction coefficient. This coefficient is held when purging is inhibited, and is progressively set to a larger value depending on the evaporative fuel-dependent correction coefficient, after purging is permitted. In another aspect, when a vehicle on which the engine is installed is started, the purge control valve is controlled based on a special purging control amount which is progressively increased based on a parameter related to a standing start of the vehicle. In another aspect, the operation of the purge control valve is inhibited for a predetermined time period dependent on a temperature of the engine, after the start of the engine.

3 Claims, 11 Drawing Sheets

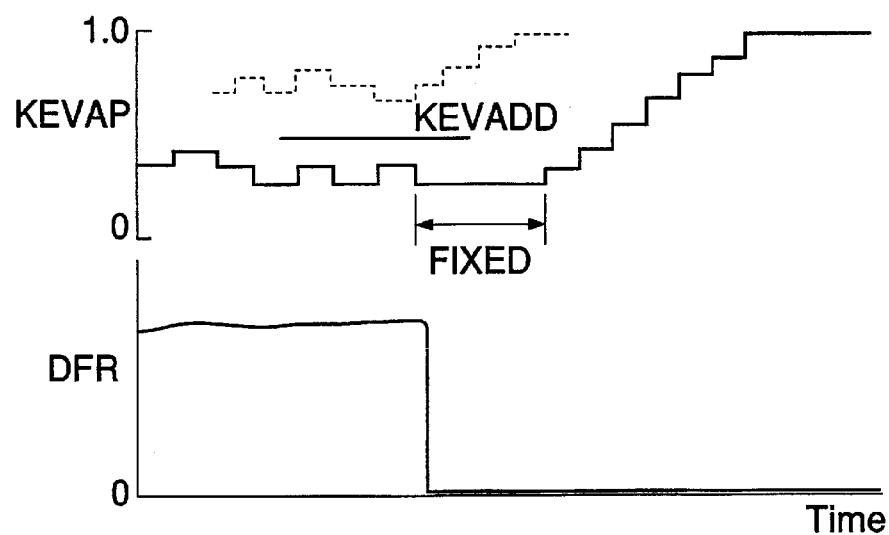
*FIG.11A*
*FIG.11B*
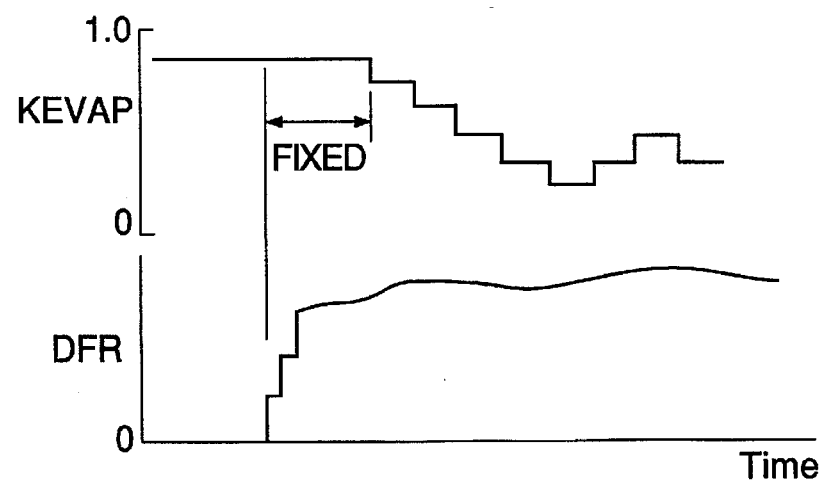
*FIG.12A*
*FIG.12B*

CONTROL SYSTEM FOR INTERNAL COMBUSTION ENGINES

This is a divisional of application Ser. No. 08/526,563 filed Sep. 12, 1995, now U.S. Pat. No. 5,546,922, which is a divisional of Ser. No. 08/187,469 filed Jan. 28, 1994, now U.S. Pat. No. 5,469,833.

BACKGROUND OF THE INVENTION

1. Field of the Invention

This invention relates to a control system including an evaporative emission control system for an internal combustion engine, which is adapted to purge evaporative fuel generated from a fuel tank into the intake system.

2. Prior Art

Evaporative fuel purged into the intake system of the engine affects or has influence on the air-fuel ratio control. Therefore, a technique (system) has been proposed, e.g. by Japanese Provisional Patent Publication (Kokai) No. 63-57841, for taking the influence of the purge into account in correcting a basic fuel injection amount, i.e. a basic amount o fuel to be supplied to the engine by injection, by the use of an air-fuel ratio correction coefficient determined based on the concentration of oxygen present in exhaust gases.

However, the proposed system detects purge of evaporative fuel, and performs purge-dependent correction of the basic fuel injection amount only while purging of the evaporative fuel is being performed.

That is, although the basic fuel injection amount is corrected when purging of evaporative has great influence on the air-fuel ratio control, the correction of the basic fuel injection amount dependent on purging of evaporative fuel is stopped when the purge of evaporative fuel is interrupted, considering that purged evaporative fuel does not affect the air-fuel ratio control any longer.

Therefore, the proposed system does not take into consideration the fact that a portion of purged evaporative fuel stays within a purging passage after purging is stopped, and is drawn into the intake system, though in a small amount.

If purging of evaporative fuel having high concentration is stopped, the influence of evaporative fuel staying within the purging passage can have a significant influence on the air-fuel ratio control, degrading responsiveness and stability thereof.

Similarly, when purging off evaporative fuel is resumed, it takes some time for the purged evaporative fuel to flow from a purge control valve through the purging passage into the intake system to have actual influence on the air-fuel ratio control. However, the proposed system does not take this delay into any account.

SUMMARY OF THE INVENTION

It is the object of the invention to provide a control system which is capable of making the air-fuel ratio control more responsive and stable by taking into account whether or not an amount of evaporative fuel stays within a purging passage when purging of evaporative fuel is stopped or resumed.

To attain the above object, according to first and second aspects of the invention, there is provided a control system for an internal combustion engine having an intake passage, a fuel tank, a canister for adsorbing evaporative fuel generated from the fuel tank, a purging passage connecting the canister and the intake passage for allowing the evaporative fuel to be purged therethrough into the intake passage, the control system including a purge control valve arranged in the purging passage for controlling a flow rate of the evaporative fuel purged through the purging passage into the intake passage, fuel injection valves for controlling an amount of fuel to be supplied to the engine by injection, operating condition-detecting means for detecting operating conditions of the engine, evaporative fuel concentration-dependent correction coefficient-setting means for setting an evaporative fuel concentration-dependent correction coefficient dependent on concentration of the evaporative fuel purged into the intake passage, purging flow rate-controlling means for controlling the purge control valve depending on the operating conditions of the engine, and fuel injection amount-controlling means for controlling the fuel injection valves based on the operating conditions of the engine detected by the operating condition-detecting means and the evaporative fuel concentration-dependent correction coefficient.

The control system according to the first aspect of the invention is characterized by comprising:

purging region-setting means for setting a purge control valve-enabling region in which the purge control valve is made operative, and a purge control valve-disabling region in which the purge control valve is made inoperative, based on the operating conditions of the engine, and evaporative fuel concentration-dependent correction coefficient-holing means for holding the evaporative fuel concentration-dependent correction coefficient to a predetermined value for a predetermined time period after the engine has shifted from the purge control valve-disabling region to the purge control valve-enabling region.

Preferably, the evaporative fuel concentration-dependent correction coefficient-setting means progressively decreases the evaporative fuel concentration-dependent correction coefficient after the lapse of the predetermined time period.

The control system according to the second aspect of the invention is characterized by comprising:

purging region-setting means for setting a purge control valve-enabling region in which the purge control valve is made operative, and a purge control valve-disabling region in which the purge control valve is made inoperative, based on the operating conditions of the engine, and evaporative fuel concentration-dependent correction coefficient-holing means for holding the evaporative fuel concentration-dependent correction coefficient to a predetermined value for a predetermined time period after the engine has shifted from the purge control valve-enabling region to the purge control valve-disabling region.

Preferably, the evaporative fuel concentration-dependent correction coefficient-setting means progressively increases the evaporative fuel concentration-dependent correction coefficient after the lapse of the predetermined time period.

More preferably, the predetermined time period is set based on the concentration of the evaporative fuel.

According to a third aspect of the invention, there is provided a control system for an internal combustion engine having an intake passage, a fuel tank, a canister for adsorbing evaporative fuel generated from the fuel tank, a purging passage connecting the canister and the intake passage for allowing the evaporative fuel to be purged therethrough into the intake passage, the control system including a purge control valve arranged in the purging passage for controlling a flow rate of the evaporative fuel purged through the purging passage into the intake passage, operating condition-detecting means for detecting operating conditions of the engine, evaporative fuel concentration-dependent correction coefficient-setting means for setting an evaporative fuel concentration-dependent correction coefficient dependent on concentration of the evaporative fuel purged into the intake passage, purging flow rate correction coefficient-setting means for setting a purging flow rate correction coefficient, and purging flow rate-controlling means for controlling the purge control valve depending on the operating conditions of the engine detected by the operating condition-detecting means and the purging flow rate correction coefficient.

The control system according to the third aspect of the invention is characterized by comprising:

purging region-setting means for setting a purge control valve-enabling region in which the purge control valve is made operative, and a purge control valve-disabling region in which the purge control valve is made inoperative, based on the operating conditions of the engine, and purging flow rate correction coefficient-updating control means for storing the purging flow rate correction coefficient to hold the purging flow rate correction coefficient when the engine is in the purge control valve-disabling region, and causing the purging flow rate correction coefficient-setting means to progressively set the purging flow rate correction coefficient to a larger value depending on the evaporative fuel concentration-dependent correction coefficient, after the engine has shifted from the purge control valve-disabling region to the purge control valve-enabling region.

Preferably, the purging flow rate correction coefficient-updating control means continues to hold the purging flow rate correction coefficient stored when it is detected based on the evaporative fuel concentration-dependent correction coefficient that the concentration of the evaporative fuel purged is high upon shifting of the engine from the purge control valve-disabling region to the purge control valve-enabling region.

Preferably, the purging flow rate correction coefficient-updating control means causes the purging flow rate correction coefficient-setting means to progressively set the purging flow rate correction coefficient to a larger value when it is detected based on the evaporative fuel concentration-dependent correction coefficient that the concentration of the evaporative fuel purged is low upon shifting of the engine from the purge control valve-disabling region to the purge control valve-enabling region.

Preferably, the purging flow rate-controlling means corrects a basic control amount dependent on operating conditions of the engine, by the use of the purging flow rate correction coefficient, to thereby set a desired value of the flow rate of the evaporative fuel purged.

According to a fourth aspect of the invention, there is provided a control system for an internal combustion engine having an intake passage, a fuel tank, a canister for adsorbing evaporative fuel generated from the fuel tank, and a purging passage connecting the canister and the intake passage for allowing the evaporative fuel to be purged therethrough into the intake passage, the engine being installed on an automotive vehicle, the control system including a purge control valve arranged in the purging passage for controlling a flow rate of the evaporative fuel purged through the purging passage into the intake passage, operating condition-detecting means for detecting operating conditions of the engine, first purging control amount-determining means for determining a first purging control amount (DFR) based on the operating conditions of the engine detected by the operating condition-detecting means, and purging flow rate-controlling means for controlling the purge control valve depending on the first purging control amount.

The control system according to the fourth aspect of the invention is characterized by comprising:

starting parameter-detecting means for detecting a parameter related to a standing start of the vehicle;

vehicle start-dependent purging control amount-calculating means for calculating a second purging control amount (DFRX) based on the parameter related to the standing start of the vehicle such that the second purging control amount is progressively increased; and vehicle start-dependent purging flow rate-controlling means for controlling the purge control valve based the second purging control amount when the vehicle performs the standing start.

Preferably, the vehicle start-dependent purging flow rate-controlling means holds the second purging control amount to a predetermined value for a predetermined time period after the vehicle has started to perform the standing start, and thereafter permits the vehicle start-dependent purging control amount-calculating means to progressively increase the second purging control amount by a predetermined incremental value.

Preferably, the vehicle start-dependent purging flow rate-controlling means permits the vehicle start-dependent purging control amount-calculating means to progressively increase the second purging control amount until the second purging control becomes equal to the first purging control amount.

According to a fifth aspect of the invention, there is provided a control system for an internal combustion engine having an intake passage, a fuel tank, a canister for adsorbing evaporative fuel generated from the fuel tank, and a purging passage connecting the canister and the intake passage for allowing the evaporative fuel to be purged therethrough into the intake passage, the engine being installed on an automotive vehicle, the control system including a purge control valve arranged in the purging passage for controlling a flow rate of the evaporative fuel purged through the purging passage into the intake passage, operating condition-detecting means for detecting operating conditions of the engine, and purging flow rate-controlling means for controlling the purge control valve depending on the operating conditions of the engine detected by the operating condition detecting means.

The control system according to the fifth aspect of the invention is characterized by comprising purging control-inhibiting means for inhibiting operation of the purge control valve for a predetermined time period dependent on a temperature of the engine, after the start of the engine.

Preferably, the purging control-inhibiting means increases the predetermined time period as the temperature of the engine is lower.

According to a sixth aspect of the invention, there is provided a control system for an internal combustion engine having an intake passage, a fuel tank, a canister for adsorbing evaporative fuel generated from the fuel tank, and a purging passage connecting the canister and the intake passage for allowing the evaporative fuel to be purged therethrough into the intake passage, the engine being installed on an automotive vehicle, the control system including a purge control valve arranged in the purging passage for controlling a flow rate of the evaporative fuel purged through the purging passage into the intake passage, operating condition-detecting means for detecting operating conditions of the engine, and purging flow rate-controlling means for controlling the purge control valve depending on the operating conditions of the engine detected by the operating condition-detecting means.

The control system according to the sixth aspect of the invention is characterized by comprising:

purging region-setting means for setting a purge control valve-enabling region in which the purge control valve is made operative, and a purge control valve-disabling region in which the purge control valve is made inoperative, based on the operating conditions of the engine, and purging inhibiting means for inhibiting operation of sad purge control valve for a predetermined time period after the engine has shifted from the purge control valve-disabling region to the purge control valve-enabling region.

According to a seventh aspect of the invention, there is provided a control system for an internal combustion engine having an intake passage, an exhaust passage, a fuel tank, a canister for adsorbing evaporative fuel generated from the fuel tank, a purging passage connecting the canister and the intake passage for allowing the evaporative fuel to be purged therethrough into the intake passage, and an exhaust gas recirculation passage connecting the exhaust passage and the intake passage for recirculation of exhaust gases, the control system including a purge control valve arranged in the purging passage for controlling a flow rate of the evaporative fuel purged through the purging passage into the intake passage, operating condition-detecting means for detecting operating conditions of the engine, purging flow rate-controlling means for controlling the purge control valve depending on the operating conditions of the engine detected by the operating condition-detecting means, an exhaust gas recirculation control valve arranged in the exhaust gas recirculation passage, and exhaust gas recirculation control means for controlling the exhaust gas recirculation valve based on an amount of exhaust gas recirculation determined depending on the operating conditions of the engine detected by the operating condition-detecting means.

The control system according to the seventh aspect of the invention is characterized by comprising purging flow rate-correcting means for correcting the flow rate of the evaporative fuel purged, depending on the amount of exhaust gas recirculation.

According to an eighth aspect of the invention, there is provided a control system for an internal combustion engine having an intake passage, a fuel tank, a canister for adsorbing evaporative fuel generated from the fuel tank, and a purging passage connecting the canister and the intake passage for allowing the evaporative fuel to be purged therethrough into the intake passage, the control system including a purge control valve arranged in the purging passage for controlling a flow rate of the evaporative fuel purged through the purging passage into the intake passage, fuel injection valves for controlling an amount of fuel to be supplied to the engine by injection, operating condition-detecting means for detecting operating conditions of the engine, air-fuel ratio-detecting means for detecting an air-fuel ratio of an air-fuel mixture supplied to the engine, air-fuel ratio correction coefficient-calculating means for calculating an air-fuel ratio correction coefficient based the air-fuel ratio of the air-fuel mixture detected by the air-fuel ratio-detecting means, evaporative fuel concentration-dependent correction coefficient-setting means for setting an evaporative fuel concentration-dependent correction coefficient dependent on concentration of the evaporative fuel purged into the intake passage, based on the air-fuel ratio correction coefficient, purging flow rate-controlling means for controlling the purge control valve depending on the operating conditions of the engine, and fuel injection amount-controlling means for controlling the fuel injection valves based on the air-fuel ratio correction coefficient and the evaporative fuel concentration-dependent correction coefficient.

The control system according to the eighth aspect of the invention is characterized in that the evaporative fuel concentration-dependent correction coefficient-setting means updates the evaporative fuel concentration-dependent correction coefficient depending on a direction of change of the air-fuel ratio correction coefficient when the purge control valve is operative.

Preferably, the evaporative fuel concentration-dependent correction coefficient-setting means decreases the evaporative fuel concentration-dependent correction coefficient when the air-fuel ratio correction coefficient is changing in a decreasing direction.

Preferably, the evaporative fuel concentration-dependent correction coefficient-setting means increases the evaporative fuel concentration-dependent correction coefficient when the air-fuel ratio correction coefficient is changing in an increasing direction.

Preferably, the evaporative fuel concentration-dependent correction coefficient-setting means updates the evaporative fuel concentration-dependent correction coefficient when the air-fuel ratio correction coefficient falls within a predetermined range.

The above and other objects, features, and advantages of the invention will be more apparent from the following detailed description taken in conjunction with the accompanying drawings.

BRIEF DESCRIPTION OF THE DRAWINGS

FIG. 9a shows changes in an initial purge-dependent correction coefficient KFRAST when purging is started;

FIG. 9b shows changes in the evaporative fuel-dependent correction coefficient KEVAP depicted in relation to FIG. 9a;

FIG. 9c shows changes in the purge duty control amount DFR depicted in relation to FIG. 9a and FIG. 9b;

FIG. 11a shows changes in the evaporative fuel-dependent correction coefficient KEVAP when the purge cut is started;

FIG. 11b shows changes in the purge duty control amount DFR depicted in relation to FIG. 11a;

FIG. 12a shows changes in the evaporative fuel-dependent correction coefficient KEVAP when purging of evaporative fuel is resumed;

FIG. 12b shows changes in the purge duty control amount DFR depicted in relation to FIG. 12a;

FIG. 13a shows changes in the air-fuel ratio correction coefficient KO2; and

FIG. 13b shows changes in the evaporative fuel-dependent correction coefficient KEVAP depicted in relation to FIG. 13a.

DETAILED DESCRIPTION

The invention will now be described in detail with reference to the drawings showing an embodiment thereof.

Figure 1:
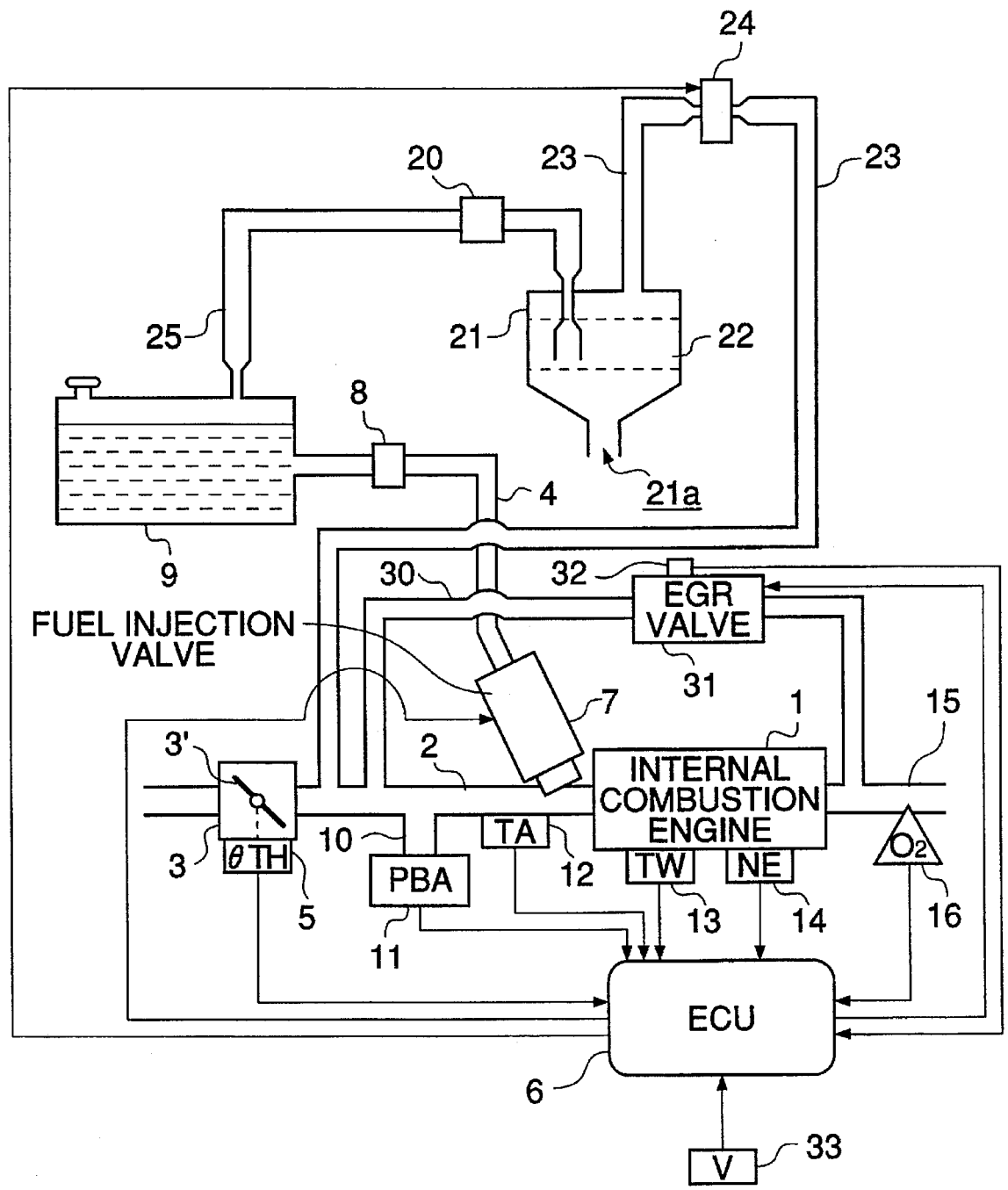
FIG. 1 is a block diagram schematically showing the whole arrangement of a control system incorporating an evaporative emission control system for an internal combustion engine, according to an embodiment of the invention.

Referring first to FIG. 1, there is illustrated the whole arrangement of a control system for an internal combustion engine, in which is incorporated an evaporative emission control system according to an embodiment of the invention.

In FIG. 1, reference numeral 1 designates the internal combustion engine (hereinafter referred to as "the engine") having four cylinders. Connected to an intake port, not shown, of the cylinder block of the engine 1 is an intake pipe 2 across which is arranged a throttle body 3 accommodating a throttle valve 3' therein. A throttle valve opening (θTH) sensor 5 is connected to the throttle valve 3' for generating an electric signal indicative of the sensed throttle valve opening θTH and supplying same to an electronic control unit (hereinafter referred to as "the ECU") 6.

Fuel injection valves 7, only one of which is shown, are inserted into the interior of the intake pipe 2 at locations intermediate between the cylinder block of the engine 1 and the throttle valve 3' and slightly upstream of respective intake valves, not shown. The fuel injection valves 7 are connected to a fuel tank 9 via a fuel supply pipe 4 having a fuel pump 8 interposed therein, arid electrically connected to the ECU 6 to have their valve opening periods duty-controlled by signals therefrom to control an amount of fuel injected (fuel injection amount).

Further, a conduit 10 branches off the intake pipe 2 at a location downstream of the throttle valve 3', and an intake pipe absolute pressure (PBA) sensor 11 is mounted at a closed end of the conduit 10, for supplying an electric signal indicative of the sensed absolute pressure PBA to the ECU 6.

An intake air temperature (TA) sensor 12 is inserted into the intake pipe 2 at a location downstream of the conduit 10, for supplying an electric signal indicative of the sensed intake air temperature TA to the ECU 6.

An engine coolant temperature (TW) sensor 13 formed of a thermistor or the like is inserted into a coolant passage filled with a coolant and formed in the cylinder block, for supplying an electric signal indicative of the sensed engine coolant temperature TW to the ECU 6.

An engine rotational speed (NE) sensor 14 is arranged in facing relation to a camshaft, not shown, of the engine 1. The engine rotational speed sensor 14 generates a pulse as a TDC signal pulse at each of predetermined crank angles whenever a crankshaft, not shown, rotates through 180 degrees, the pulse being supplied to the ECU 6.

An oxygen concentration ($O_2$) sensor (hereinafter referred to as "the $O_2$ sensor") 16 is inserted into an exhaust pipe 11 extending from an exhaust port, not shown, of the engine 1, for detecting concentration of oxygen present in exhaust gases and supplying an electric signal indicative of the sensed oxygen concentration to the ECU 6.

The evaporative emission control system extends from the top of the fuel tank 9 which is airtight closed, to the intake pipe 2.

More specifically, the evaporative emission control system is comprised of a canister 21 containing an adsorbent 22, a charging passage 25 connecting the top of the fuel tank 9 and the canister 21, with a two-way valve 20 arranged therein, and a purge pipe (purging passage) 23 extending from the canister 21 to a portion of the intake pipe 2 at a location immediately downstream of the throttle body 3, with a purge control valve 24 arranged therein.

The purge control valve 24 is an electromagnetic valve of a linear control type having a solenoid, not shown, for driving a valving element thereof, not shown. The purge control valve 24 is supplied with a duty control signal from the ECU 6 to have a degree of opening thereof duty-controlled in a linear manner.

When the pressure of evaporative fuel generated from the fuel tank 9 reaches a predetermined set pressure of the two-way valve 20 to open a positive pressure valve thereof, not shown, the evaporative fuel is permitted to flow into the canister 21 to be adsorbed by the adsorbent 22 within the canister 21.

The purge control valve 24 remains closed when the solenoid thereof is not supplied with the duty control signal from the ECU 6. When the solenoid is energized by the duty control signal, the purge control valve 24 is opened to a degree corresponding to an amount of energization, thereby allowing the evaporative fuel temporarily stored in the canister 21 to be drawn into the intake pipe 2 via the purging passage 23 by negative pressure created within the intake pipe 2, together with air introduced from outside the system via an air inlet port 21a provided in the canister When the fuel tank 9 is cooled e.g. by the outside air to increase the negative pressure within the fuel tank 9, i.e. reduce the pressure within same, to a predetermined set pressure of the two-way valve 20 to open a negative pressure valve thereof, not shown, the evaporative fuel stored in the canister 21 is returned to the fuel tank 9. The evaporative emission control system thus prevents the evaporative fuel generated within the fuel tank 9 from being emitted into the atmosphere.

Further, the control system also includes an exhaust gas recirculation (EGR) passage 30 connecting the exhaust pipe 15 to the intake pipe 2. The exhaust recirculation passage 30 has an EGR valve 31 arranged therein for permitting recirculation of exhaust gases to the intake pipe 2. The EGR valve 31 is driven by a control signal delivered from the ECU 6. An EGR valve opening senor 32 is mounted on the EGR valve 31 for detecting the degree of opening thereof to supply an electric signal indicative of the sensed EGR valve opening to the ECU 6.

Further, a vehicle speed sensor 33 is provided for detecting the traveling speed of an automotive vehicle on which the engine is installed and supplies an electric signal indicative of the sensed vehicle speed to the ECU 6.

The ECU 6 comprises an input circuit having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU"), memory means storing programs executed by the CPU and for storing results of calculations therefrom, etc., and an output circuit which outputs the control signals (driving signals) to the fuel injection valves 7, the two-way valve 20, The purge control valve 24, and the EGR control valve 31.

The CPU determines various engine operating conditions, such as a feedback control region in which the air-fuel ratio control should be carried out in a feedback manner according to concentration of oxygen in exhaust gases, and open-loop control regions, based on engine operating parameters detected by the sensors described above, and calculates a fuel injection period (i.e. fuel injection amount) Tout over which each of the fuel injection valves 7 should be opened, by the use of the following equation (1):

$$Tout = Ti \times KO2 \times KEVAP \times K1 + K2 \qquad (1)$$

where Ti represents a basic value of the fuel injection period Tout, which is read from a Ti map according to the engine rotational speed NE and the intake pipe absolute pressure PBA.

KO2 represents a first correction coefficient (air-fuel ratio correction coefficient) which is set according to the oxygen concentration in exhaust gases detected by the $O_2$ sensor 16 during an $O_2$ feedback control mode, and to predetermined values when the engine is in the above-mentioned open-loop control regions, respectively.

KEVAP represents a second correction coefficient (evaporative fuel-dependent correction coefficient) set in a manner compensating for influence of purged evaporative fuel on the air-fuel ratio control, which is supplied to the engine in addition to fuel injected. When the air-fuel ratio control is free from influence of the purged evaporative fuel, the evaporative fuel-dependent correction coefficient KEVAP is set to 1.0, and otherwise to a value within a range of 0 to 1.0, the smaller value thereof reflecting the greater influence of the purged evaporative fuel on the air-fuel ratio control, i.e. the greater amount of evaporative fuel supplied by purging to the engine.

The second correction coefficient (evaporative fuel dependent correction coefficient) KEVAP is a correction coefficient correlated with concentration of evaporative fuel, which increases in a proportional manner with increase in duration of execution of purging. As will be described in detail hereinafter with reference to FIG. 5 to FIG. 7, in the present embodiment, the correction coefficient is determined depending on concentration of evaporative fuel indirectly detected from a manner of change in the first correction coefficient (air-fuel ratio correction coefficient) KO2.

K1 and K2 represent other correction coefficients and correction variables, respectively, determined according to engine operating parameters, and are set to such values as optimize engine operating characteristics, such as fuel consumption and engine accelerability.

Procedures of the evaporative emission control performed by the evaporative emission control system will be described below with reference to FIG. 2 to FIG. 13.

Figure 2:
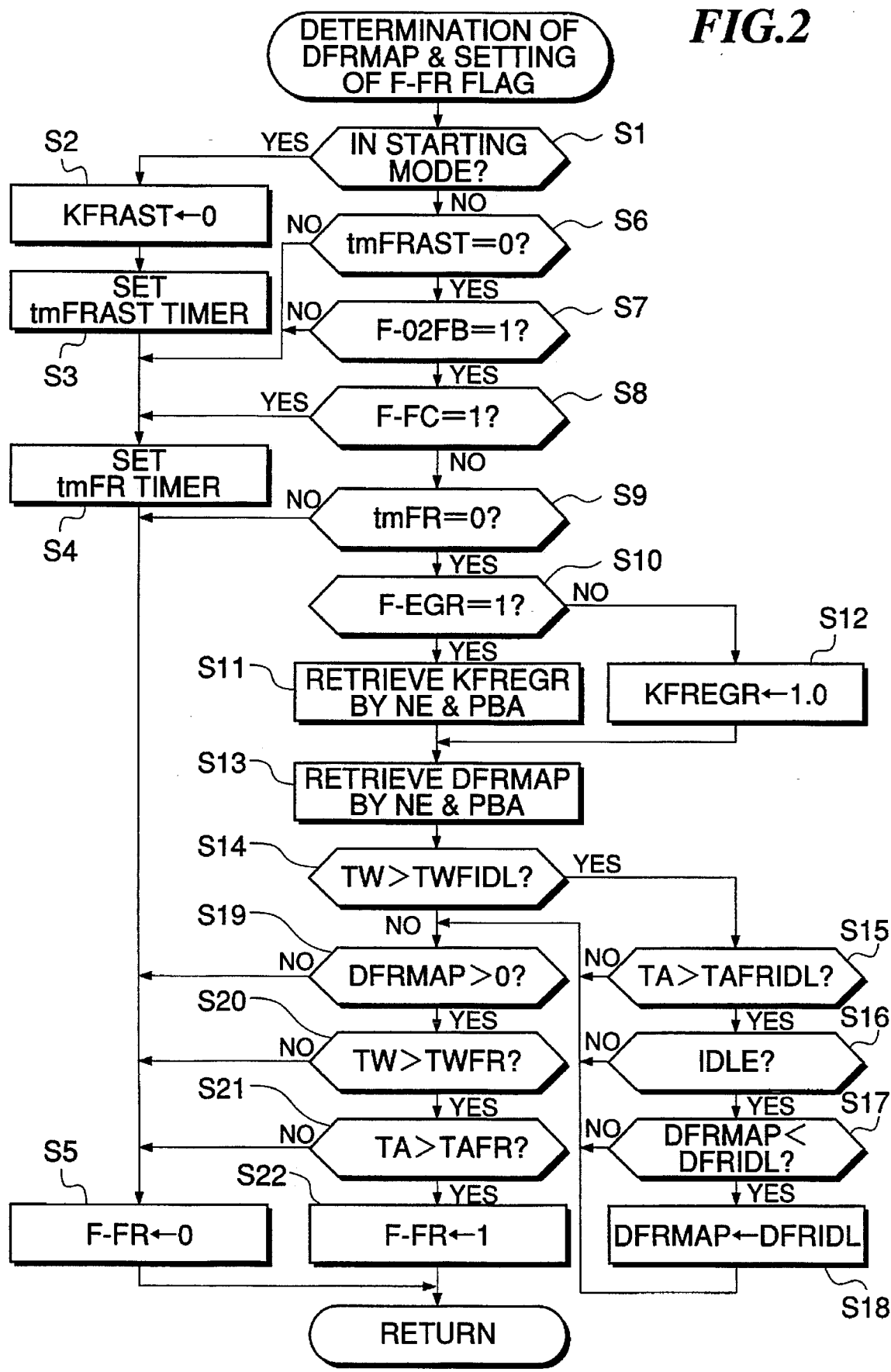
FIG. 2 is a flowchart of a routine for controlling the opening and closing of a purge control valve, which is executed by the evaporative emission control system.
Figure 3:
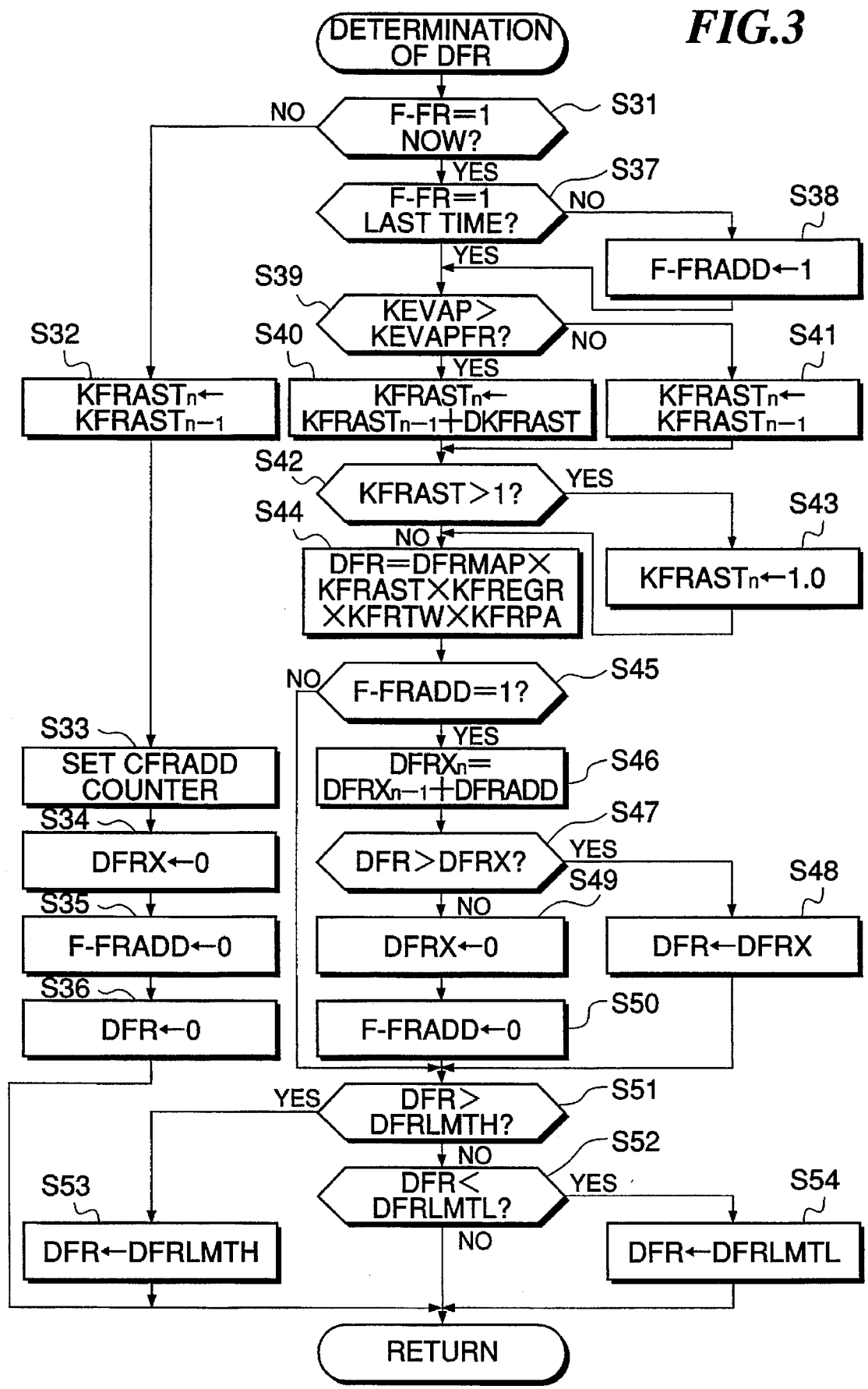
FIG. 3 is a flowchart of a routine for determining a purge duty control amount DFR.

First, a manner of control of the purge control valve 24 will be described with reference to FIG. 2 showing a routine for finally determining whether or not the purge control valve 24 should be opened, and FIG. 3 showing a routine for determining a purge duty control amount DFR, i.e. a degree of opening of the purge control valve 24 to which it is controlled when it should be opened. These routines are executed in synchronism with interrupt timing based on each TDC signal pulse.

Referring to FIG. 2, at a step S1, it is determined based on operating conditions of the engine, such as the engine coolant temperature TW, whether or not the engine is in the starting mode. If the engine is in the starting mode, the program proceeds to a step S2, where an initial purge-dependent correction coefficient KFRAST for use in calculation of the purge duty control amount DFR is set to "0", and an initial purge delay timer tmFRAST and a purge delay timer tmFR are set, at respective steps S3 and S4. Then, a purge enable flag F-FR for the purge control valve 24 is set to "0" to inhibit the operation of the purge control valve 24 (i.e. perform purge cut) at a step S5.

The initial purge delay timer tmFRAST is set e.g. to 50 seconds when the engine coolant temperature TW is above a predetermined temperature, otherwise to 200 seconds.

When the engine 1 leaves the starting mode, the program proceeds to a step S6, where it is determined whether or not the count value of the initial purge delay timer tmFRAST becomes equal to 0. Before the predetermined time period set at the step S3 elapses, the program proceeds to the steps S4 and S5, performing the purge cut.

The inhibition of purging of evaporative fuel over the predetermined time period after the start of the engine is intended for stability and convergence of the air-fuel ratio control.

When the engine coolant temperature is low, the air-fuel ratio is controlled to an enriched value. Therefore, in such a case, the initial purge delay timer tmFRAST is set to a long time period to prevent the air-fuel ratio from becoming excessively rich, thereby stabilizing the air-fuel ratio of a mixture supplied to the engine (hereinafter referred to as "the supply air-fuel ratio") when the engine coolant temperature is low, so as to preserve the drivability of the engine.

When the predetermined time period elapses after the engine left the starting mode, the program proceeds from the step S6 to a step S7, where it is determined from a flag F-02FB whether or not the air-fuel ratio $O_2$ feedback control is being performed. If the flag F-02FB is equal to "0", i.e. if the air-fuel ratio $O_2$ feedback control is not being performed, the program proceeds to the steps S4 and S5 to execute the purge cut. If the flag F-02FB is equal to "1" indicating that the air-fuel ratio $O_2$ feedback control is being performed, the program proceeds to a step S8, where it is determined from a flag F-FC whether or not the fuel cut is being performed, i.e. the fuel supply to the engine is interrupted.

If the flag F-FC is equal to "1" indicating that the fuel cut is being performed, the program proceeds to the steps S4 and S5, whereas if it is equal to "0" indicating that the fuel cut is not performed or has been stopped to resume fuel injection, the program proceeds to a step S9, where it is determined whether or not the timer tmFR set at the step S4 has counted up a time period set thereto. Before the set time period has not elapsed, the program proceeds to the step S5, and after the set time period has elapsed, the program proceeds to a step S10.

The air-fuel ratio O2 feedback control is initialized when it is resumed. Therefore, purging is inhibited to prevent an excessive correction of the fuel injection amount from being made based on the first correction coefficient KO2.

At the step S10, it is determined from a flag F-EGR whether or not the exhaust gas recirculation is being performed by opening the EGR value 31. If the flag F-EGR is equal to "1", indicating that the EGR is being performed, the program proceeds to a step S11, where an EGR-dependent correction coefficient KFREGR for use in calculation of the purge duty control amount DFR is determined by retrieving a KFREGR map according to the engine rotational speed NE and the intake pipe absolute pressure PBA.

Figure 8:
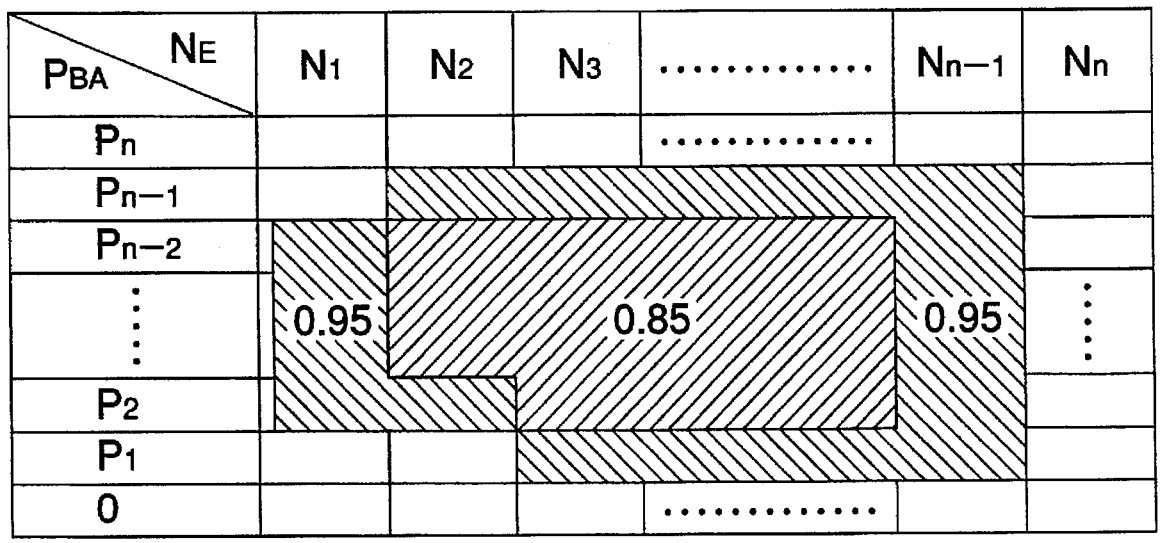
FIG. 8 shows a KFREGR map for determining an EGR-dependent purge correction coefficient KFREGR for use in determining the evaporative fuel-dependent correction coefficient KEVAP.

FIG. 8 shows the KFREGR map, in which are provided a region of KFREGR=0.85 and a region of KFREGR=0.95 surrounding the 0.85 region, as well as the other regions (KFREGR=1.0), in a manner corresponding to predetermined ranges of the engine rotational speed NE divided by predetermined values thereof and predetermined ranges of the intake pipe absolute pressure PBA divided by predetermined values thereof.

One of the regions is selected according to a combination of the engine rotational speed NE and the intake pipe absolute pressure PBA, and the correction coefficient KFREGR is set to a value assigned to the selected region.

As the amount of exhaust gas recirculation increases, the ratio of contribution of a mixture to combustion decreases. Therefore, a map value DFRMAP, referred to below, of the purge duty control amount DFR is corrected by the EGR-dependent correction coefficient KFREGR during the EGR to decrease the purge amount as well, thereby preventing the air-fuel ratio from becoming overrich.

If the EGR is not being performed, the program proceeds to a step S12, where the EGR-dependent correction coefficient KFREGR is set to 1.0 to inhibit the EGR-dependent correction of the purge duty control amount DFR.

Then, at a step S13, a DFR map is retrieved to determine a map value DFRMAP of the purge duty control amount DFR for determining the degree of opening of the purge control valve 24 according to the engine rotational speed NE and the intake pipe absolute pressure PBA.

Then, at a step S14, it is determined whether or not the engine coolant temperature TW is higher than a predetermined value TWFRIDL. If the answer to this question is negative (NO), the program jumps over to a step S19, whereas if the answer is affirmative (YES), the program proceeds to a step S15, where it is determined whether or not the intake air temperature TA is higher than a predetermined value TAFRIDL. If the answer to this question is negative (NO), the program jumps over to the step S19, whereas if the answer is affirmative (YES), the program proceeds to a step S16, where it is determined whether or not the engine is idling.

Under the conditions of a high engine coolant temperature, a high intake air temperature, and idling of the engine, it is determined at a step S17 whether or not the map value DFRMAP of the purge duty control amount DFR read from the DFR map at the step S13 is smaller than a predetermined small value DFRIDL. If the answer to the question is affirmative (YES), the purge duty control amount DFR is set to the predetermined small value DFRIDL at a step S18 to permit purging of evaporative fuel at a flow rate determined by this small value of the purge duty control amount. The predetermined small value DFRIDL is set to such a small value that purging of evaporative fuel based thereon has no significant influence on the air-fuel ratio control. Then, the program proceeds to the step S19.

Outside the condition determined by the steps S14, S15, S16, and S17, the program jumps over to the step S19, without correcting the map value DFRMAP of the purge duty control amount DFR read from the DFR map at the step S13.

At the step S19, it is determined whether or not the map value DFRMAP obtained is larger than 0. If the map value DFRMAP of the purge duty control amount DFR is equal to 0, the program jumps over to the step S5 to inhibit purging, whereas if the map value DFRMAP is larger than 0, the program proceeds to a step S20, where it is determined whether or not the engine coolant temperature TW is higher than a predetermined value TWFR. If the answer to this question is negative (NO), the program jumps over to the step S5, whereas if the answer is affirmative (YES), i.e. if TW>TWFR, the program proceeds to a step S21, where it is determined whether or not the intake air temperature TA is higher than a predetermined value TAFR. If the answer to this question is negative (NO), the program jumps over to the step S5, whereas if the answer is affirmative (YES), the program proceeds to a step S22, where the purge enable flag F-FR is set to "1", followed by terminating the program.

Thus, according to this routine, the map value DFRMAP of the purge duty control amount DFR is determined and at the same time the it is determined whether or not purging of evaporative fuel should be permitted.

Next, procedures of determining the purge duty control amount DFR actually applied will be described with reference to routines of FIG. 3 and FIG. 4. These routines are executed at intervals (e.g. of 100 msec) measured by respective timers, not shown.

First, it is determined at a step S31 whether or not the purge enable flag F-FR is equal to "1" for the present loop. If F-FR is equal to "0", i.e. if under the purge cut condition, the program proceeds to a step S32, where the initial purge-dependent correction coefficient KFRASTn for the present loop is set to the immediately preceding value KFRASTn−1 to preserve the set value thereof. Then, at a step S33, a counter CFRADD is set, at a step S34, an early stage amount-setting value DFRX is set to 0, at a step. S35, a flag F-FRADD for indicating whether the purge is at its early stage is set to "0", and then at a step S36, the purge duty control amount DFR is set to 0.

If the flag F-FR becomes equal to "1", the program proceeds from the step S31 to the step S37, where it is determined whether or not the flag F-FR was equal to "1" in the immediately preceding loop. If the answer to this question is negative (NO), i.e. if purging of evaporative fuel is permitted for the first time for the present loop, the program proceeds to a step S38, where the flag F-FRADD is set to "1" to indicate that the purge is at its early stage. If purging of evaporative fuel was permitted in the immediately preceding loop as well, the program jumps from the step S37 over to the step S39.

At the step S39, it is determined whether or not the evaporative fuel-dependent correction coefficient KEVAP is larger than a predetermined value KEVAPFR. If the answer to this question is affirmative (YES), the program proceeds to a step S40, where the a predetermined incremental value DKFRAST is added to the immediately preceding value KFRASTn−1 of the initial purge-dependent correction coefficient KFRAST to set the present value KFRASTn of same, thereby stepwise increasing the purge amount whenever this step is carried out.

Then, the program proceeds to a step S42, where it is determined whether not the initial purge-dependent correction coefficient KFRASTn is larger than 1. If the answer to this question is affirmative (YES), the initial purge-dependent correction coefficient KFRASTn is set to a limit value of 1.0 at a step S43, followed by the program proceeding to a step S44.

On the other hand, if the answer to the question of the step S39 is negative (NO), i.e. if KEVAP≦KEVAPFR, the program proceeds to a step S41, where the initial purge-dependent correction coefficient KFRAST is set to the immediately preceding value KFRASTn-1 thereof to hold the set value, followed by the program proceeding to the step S42.

That is, at an initial stage of the purge, if the evaporative fuel-dependent correction coefficient KEVAP for correcting the fuel injection amount is large or close to 1.0, which implies that the influence of the purge on the air-fuel ratio control is not great, the purge amount is progressively increased, whereas if the correction coefficient KEVAP is small, which implies that the influence of the purge is great, an increase in the purge amount is suppressed.

At the step S43, the purge duty control amount DFR is calculated by the use of the following equation (2):

$$DFR = DFRMAP \times KFRAST \times KFREGR \times KFRTW \times KFRPA \quad (2)$$

That is, the map value DFRMAP is multiplied by the initial purge-dependent correction coefficient KFRAST, the EGR-dependent correction coefficient KFREGR, a coolant temperature-dependent correction coefficient KFRTW, and an atmospheric pressure-dependent correction coefficient KFRPA to obtain the purge duty ratio DFR.

The coolant temperature-dependent correction coefficient KFRTW is determined by retrieving a KFRTW table according to the engine coolant temperature TW. The KFRTW table is set such that a table value of the correction coefficient KFRTW becomes closer to 1.0 as the engine coolant temperature TW rises, thereby increasing the purge amount.

The atmospheric pressure-dependent correction coefficient KFRPA is determined by retrieving a KFRPA table according to the atmospheric pressure PA. The KFRPA table is set such that a table value of the correction coefficient KFRPA is set to 1.0 when the atmospheric pressure is equal to a value detected at a lowland, and increases as the atmospheric pressure decreases, i.e. the automotive vehicle on which the engine is installed is running on a land at a higher level, to thereby compensate for an increasing difficulty in purging of evaporative fuel at the higher level.

After calculation of the purge duty control amount DFR, the program proceeds to a step S45, where it is determined from the flag F-FRADD whether or not the present purge is at its early stage. If the answer to this question is negative (NO), the program jumps over to a step S51 without correcting the purge duty control amount DFR, whereas if the answer is affirmative (YES), the program proceeds to a step S46.

At the step S46, an early stage incremental value DFRADD is added to the immediately preceding value DFRXn-1 of the early stage amount-setting value DFRX to set the present value DFRXn thereof.

The immediately preceding value DFRXn-1 of the early stage amount-setting value DFRX is initially set to 0 at the step S34. The early stage incremental value DFRADD is determined according to a FIG. 4 routine which will be described hereinafter.

Then, at the following step S47, it is determined whether or not the purge duty control amount DFR determined at the step S44 is larger than the present value DFRXn of the early stage amount-setting value DFRX. If the answer to this question is affirmative (YES), the program proceeds to a step S48, where the purge duty control amount DFR is set to the present value DFRXn of the early stage amount-setting value DFRX. Thus, so long as the present value DFRXn is smaller than the purge duty control amount DFR, the program proceeds to the step S48, where the purge duty control amount DRF is set to the present value DFRXn which is stepwise increased by adding the early stage incremental value DFRADD to the immediately preceding value DFRXn-1 at the step S46, followed by the program proceeding to the step S51.

When the present value DFRXn of the early stage amount-setting value becomes equal to or larger than the purge duty control amount DFR, the program proceeds from the step S47 to a step S49, where the early stage amount-setting value DFRX is reset to 0, and the flag F-FRADD is set to "0" at a step S50, followed by the program proceeding to the step S51.

Therefore, in the following loops, the program proceeds from the step S45 to the step S51, permitting the use of the purge duty control amount DFR obtained at the step S45 without performing a special calculation of the purge duty control amount DFR for the early stage of the purge.

At the step S51 et seq., a limit check of the purge duty control amount DFR is performed, by determining at the step S51 whether the purge duty control amount DFR is larger than a upper limit value DFRLMTH, and at a step S52 whether the purge duty control amount DFR is smaller than a lower limit value DFRLMTL. The purge duty control amount DFR is set to the upper limit value DFRLMH at a step S53 if the purge duty control amount DFR is larger than the upper limit value DFRLMH, whereas the purge duty control amount DFR is set to the lower limit value DFR-LMTL at a step S54, if the purge duty control amount DFR is smaller than the predetermined lower limit value DFR-LMTL. After the limit check, the present routine is terminated.

Thus, the purge duty control amount DFR is determined, and the purge control valve 24 is controlled based on the purge duty control amount DFR to permit a suitable amount of evaporative fuel to be drawn into the intake pipe 2.

Figures 9A, 9B, 9C:
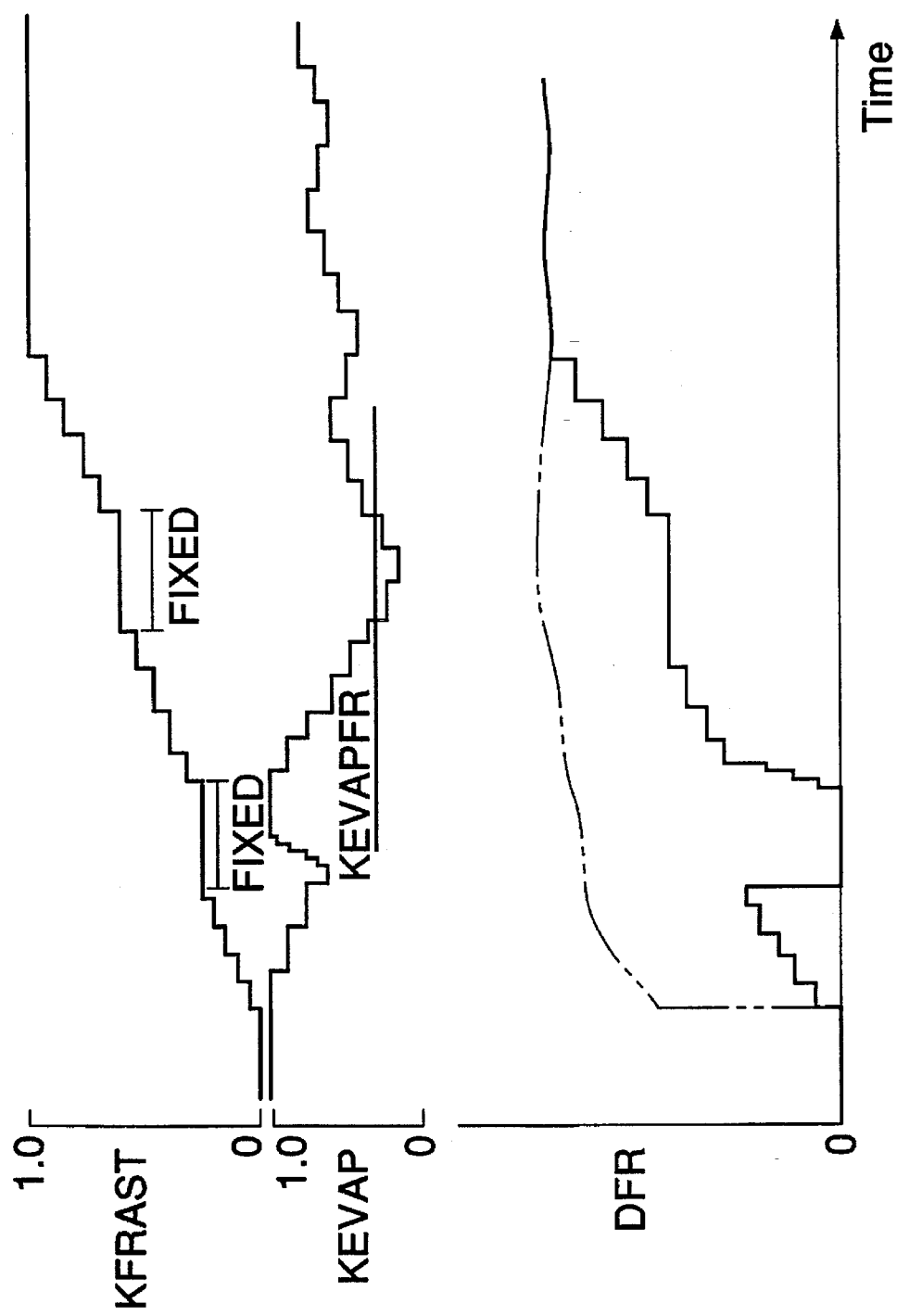

A manner of increase in the initial purge-dependent correction coefficient KFRAST effected by the FIG. 3 routine will be described with reference to FIG. 9a depicted in relation to changes in the evaporative fuel-dependent correction coefficient KEVAP for the fuel injection amount shown in FIG. 9b and changes in the purge duty control amount DFR shown in FIG. 9c.

As shown in these figures, before the start of purging after the start of the engine, the initial purge-dependent correction coefficient KFRAST is equal to 0, the evaporative fuel-dependent correction coefficient KEVAP is equal to 1.0, and the purge duty control amount DFR is equal to 0 to inhibit purging.

When the purging is started, the steps S46, S47, arid S48 are repeatedly carried out to progressively increase the purge duty control amount DFR, while decreasing the evaporative fuel-dependent correction coefficient KEVAP from the value of 1.0.

Since the evaporative fuel-dependent correction coefficient KEVAP is larger than the predetermined value, KEVAPFR at first, the step S40 is repeatedly carried out to progressively increase the initial purge-dependent correction coefficient KFRAST. That is, the purge amount is thus progressively increased thereby.

Then, when the purging is interrupted, the purge duty control amount DFR is set to 0. However, the initial purge-dependent correction coefficient KFRAST is held to the immediately preceding value at the step S32, and when the purging is resumed, the initial purge-dependent correction coefficient KFRAST starts to be progressively increased again.

When the evaporative fuel-dependent correction coefficient KEVAP is progressively decreased to a value smaller than the predetermined value KEVAPER to permit the great influence of purge on the air-fuel ratio, the initial purge-dependent correction coefficient KFRAST is held to the immediately preceding value at the step S41 to prevent it from being unnecessarily increased. When the influence of the purge ceases to be so great (i.e. KEVAP>KEVAPFR), the initial purge-dependent correction coefficient KFRAST starts to be increased again, thus finally reaching a value of 1.0.

Thus, while the purging is stopped, the initial purge-dependent correction coefficient KFRAST is held to the immediately preceding value, whereby when the purging is resumed, the initial purge-dependent correction coefficient KFRAST is stepwise increased by adding the predetermined incremental value DKFRAST thereto, to prevent the purge control from being delayed in following up the map value DFRMAP responsive to operating conditions of the engine.

Further, when the engine is operating with such high concentration of evaporative fuel as will make the evaporative fuel-dependent correction coefficient KEVAP smaller than the predetermined value KEVAPER, a sudden change in the supply air-fuel ratio and too large a correction of the fuel injection amount made by the evaporative fuel-dependent correction coefficient KEVAP, which would arise due to an increase in the purge duty control amount DFR during purging, can be prevented by holding the initial purge-dependent correction coefficient KFRAST to the immediately preceding value.

Figure 4:
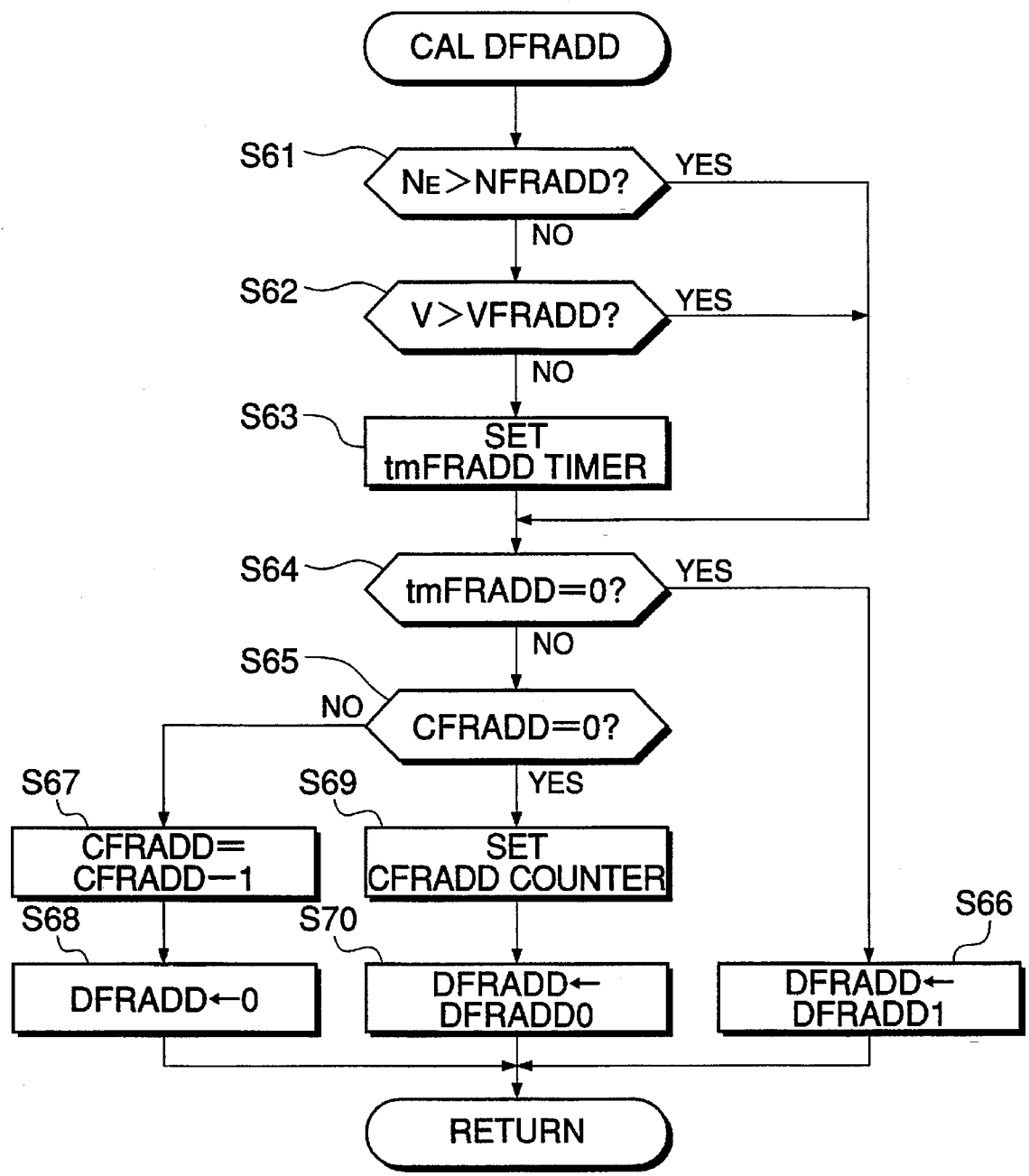
FIG. 4 is a flowchart of a routine for determining an incremental value DFRADD to be added to an early stage amount-setting value.

Next, procedures of determining the early stage incremental value DFRADD, which is added to the immediately preceding value DFRXn−1 of the early stage amount-setting value DFRX at the step S46 of the FIG. 3 routine, with reference to FIG. 4.

First, at a step S61, it is determined whether or not the engine rotational speed NE is larger than a predetermined value NFRADD. At a step S62, it is determined whether or not the vehicle speed V detected by the vehicle speed sensor 33 is larger than a predetermined value VFRADD. If the engine rotational speed NE is low (i.e. NE≦NFRADD) and at the same time the vehicle speed V is low (i.e. V≦VFRADD), a timer tmFRADD is set at a step S63, followed by the program proceeding to a step S64. Otherwise, the program jumps over to the step S64 without setting the timer tmFRADD.

At the step S64, it is determined whether or not the count value of the timer tmFRADD becomes equal to 0. If the answer to this question is negative (NO), the program proceeds to a step S65, where it is determined whether or not the count value of the counter CFRADD set at the step S33 of the FIG. 3 routine becomes equal to 0.

When the timer tmFRADD is not set under the conditions off a high engine rotational speed NE and a high vehicle speed V, the program jumps from the step S64 over to a step S66, where the early stage incremental value DFRADD is set to a predetermined value DFRADD1, which is set to a fairly large value. Therefore, under a condition other than the starting mode of the engine, e.g. when the transmission gear is shifted, the early stage incremental value DFRADD is set to the large value to permit the early stage amount-setting value DFRX and hence the purge duty control amount DFR, to increase rapidly, when the purging is resumed.

On the other hand, when the vehicle is started, the timer tmFRADD is set (at the step S63), and the counter CFRADD is monitored (at the step S65) until the timer tmFRADD has counted up (at the step S64). At first, the counter CFRADD is not equal to 0, and accordingly the program proceeds to a step S67 to decrease the count value of the counter CFRADD by a decremental value off 1, and the early stage incremental value DFRADD is set to 0 at a step S68 until the count value of the counter CFRADD is decreased to 0, thereby holding the early stage amount-setting value DFRX and hence the purge duty control amount DFR, to 0.

When the count value off the counter CFRADD becomes equal to 0, the program proceeds to a step S69, where the counter CFRADD is reset, and the early stage incremental value DFRADD is set to a predetermined value DFRADD0, which is set to a small value, at a step S70, thereby permitting the early stage amount-setting value DFRX to be increased of the step S46 of the FIG. 3 routine, and hence the purge duty control amount DFR, by the small incremental value (DFRADD).

Since the counter CFRADD is reset, the program proceeds to the steps S67 and S67 in the following loops, and the early stage amount-setting value DFRX and hence the purge duty control amount DFR remains equal to the immediately preceding value. When the count value of the counter CRFADD is reduced to 0 again, the steps S69 and S70 are carried out again to further increase the early stage amount-setting value DFRX, and hence the purge duty control amount DFR.

This procedure is repeatedly carried out to thereby progressively increase the purge duty control amount DFR by the small incremental value until the timer tmFRADD has counted up. When the predetermined time period has elapsed, i.e. when the timer tmFRADD has counted up, the step S66 is carried out to increase the purge duty control amount DFR at the large rate.

Figure 10:
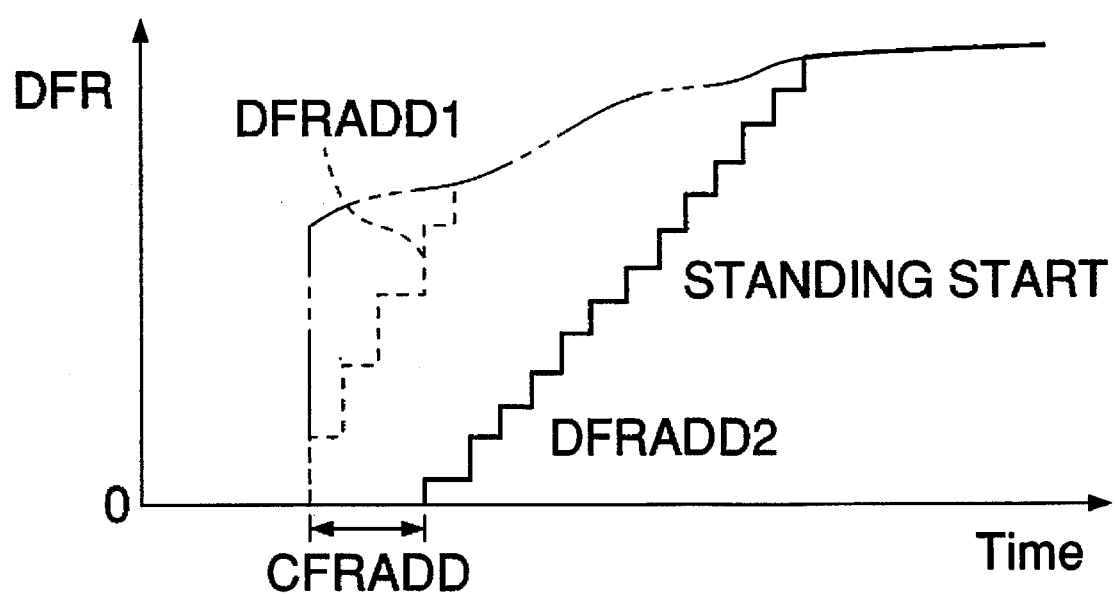
FIG. 10 shows changes in the purge duty control amount DFR when a vehicle on which the engine is installed is started.

Changes in the purge duty control amount DFR effected by the above routines will be explained with reference to FIG. 10.

As shown in actual changes in the purge duty control amount DFR (designated by the solid line), when the vehicle is started after the start of the engine, even if the purge duty control amount DFR (designated by the two dot chain line) is calculated since it is determined at the step S45 that the purge is at its early stage, the purge duty control amount DFR is set to the early stage amount-setting value DFRX before it is determined DFR>DFRX at the step S47. However, the early stage incremental value DFRADD remains equal to 0 (by the step S68) until the count value of the counter CFRADD becomes equal to 0, and hence the purge duty control amount DFR is finally held to 0 to inhibit the purging. When the count value of the counter CFRADD becomes equal to 0, the purge duty control amount DFR is increased by the early stage incremental value DFRADD at the step S70, and thereafter the purge duty control amount DFR stepwise increased by the predetermined incremental value DFRADD0 which is rather small.

That is, when the vehicle is started, the purple duty control amount DER is set to 0 for the predetermined time period (CFRADD), whereby possible to prevent the air-fuel ratio of a mixture from being made overrich, immediately after the purging is resumed, due to purging of evaporative fuel stored in high concentration within the canister and the supply of a small amount of intake air, which can result in a drop in the output torque and a degraded startability of the vehicle resulting therefrom.

After the lapse of the predetermined time period, the purge duty control amount DFR is progressively increased to a value responsive to operating conditions of the engine, to thereby prevent a sudden change in the air-fuel ratio of the supply air fuel-ratio when the vehicle is started.

When the purging is resumed on occasions other than the standing start of the vehicle, e.g. when the transmission gear is shifted, as designated by the broken line, the purge duty control amount DFR is stepwise increased by the predetermined incremental DFRADD1 which is rather large (at the step S66) to rapidly reach the purge duty control amount DFR obtained by calculation (designated by the two-dot chain line).

The operation of the purge control valve 24 is controlled as described heretofore.

Next, the determination of the evaporative fuel-dependent correction coefficient KEVAP corresponding to a degree of the influence of the purge on the air-fuel ratio control will be described with reference to FIG. 5 to FIG. 7.

Figure 5:
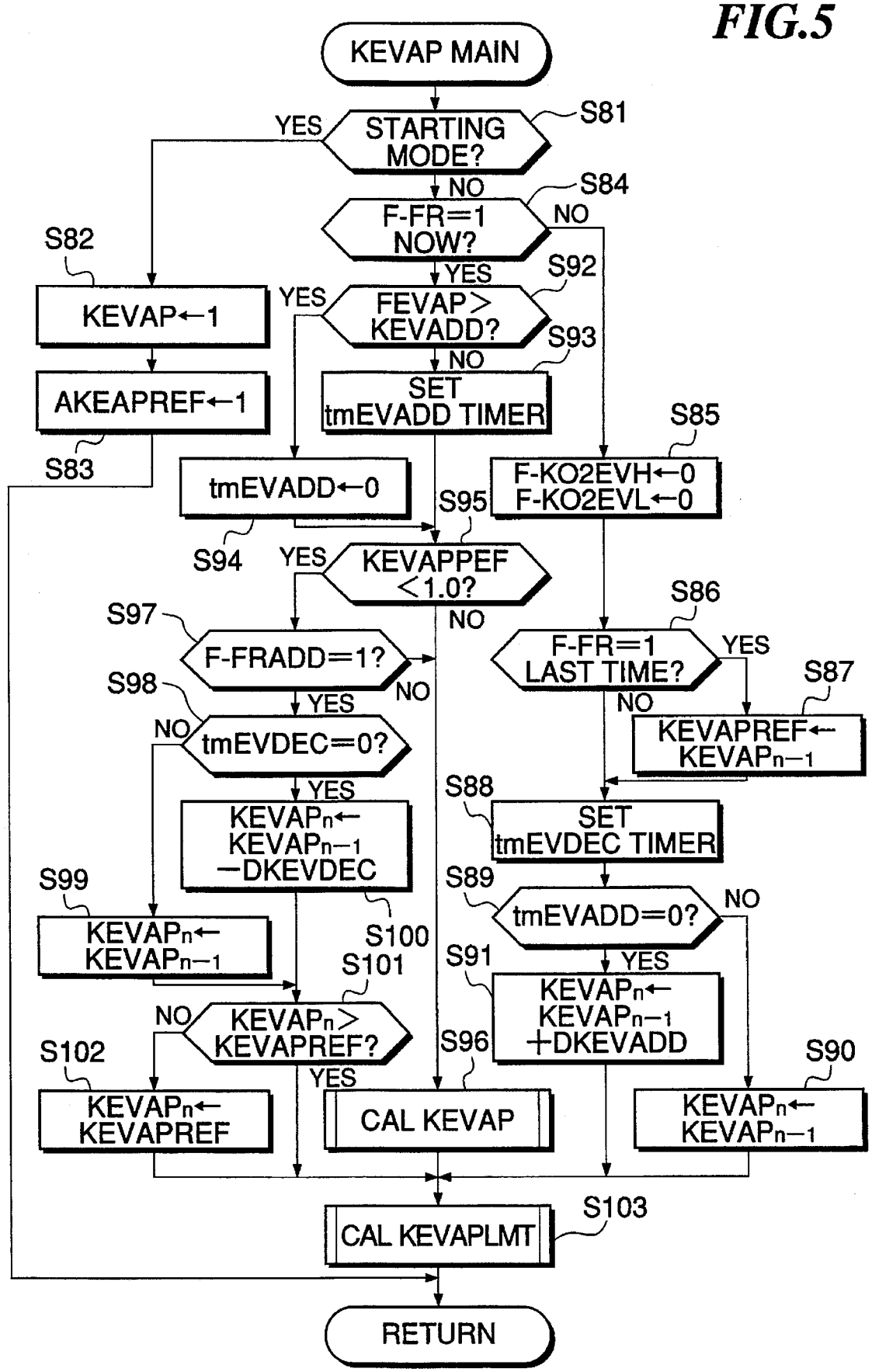
FIG. 5 is a flowchart of a main routine for determining an evaporative fuel-dependent correction coefficient KEVAP for use in determining a fuel injection amount.
Figure 6:
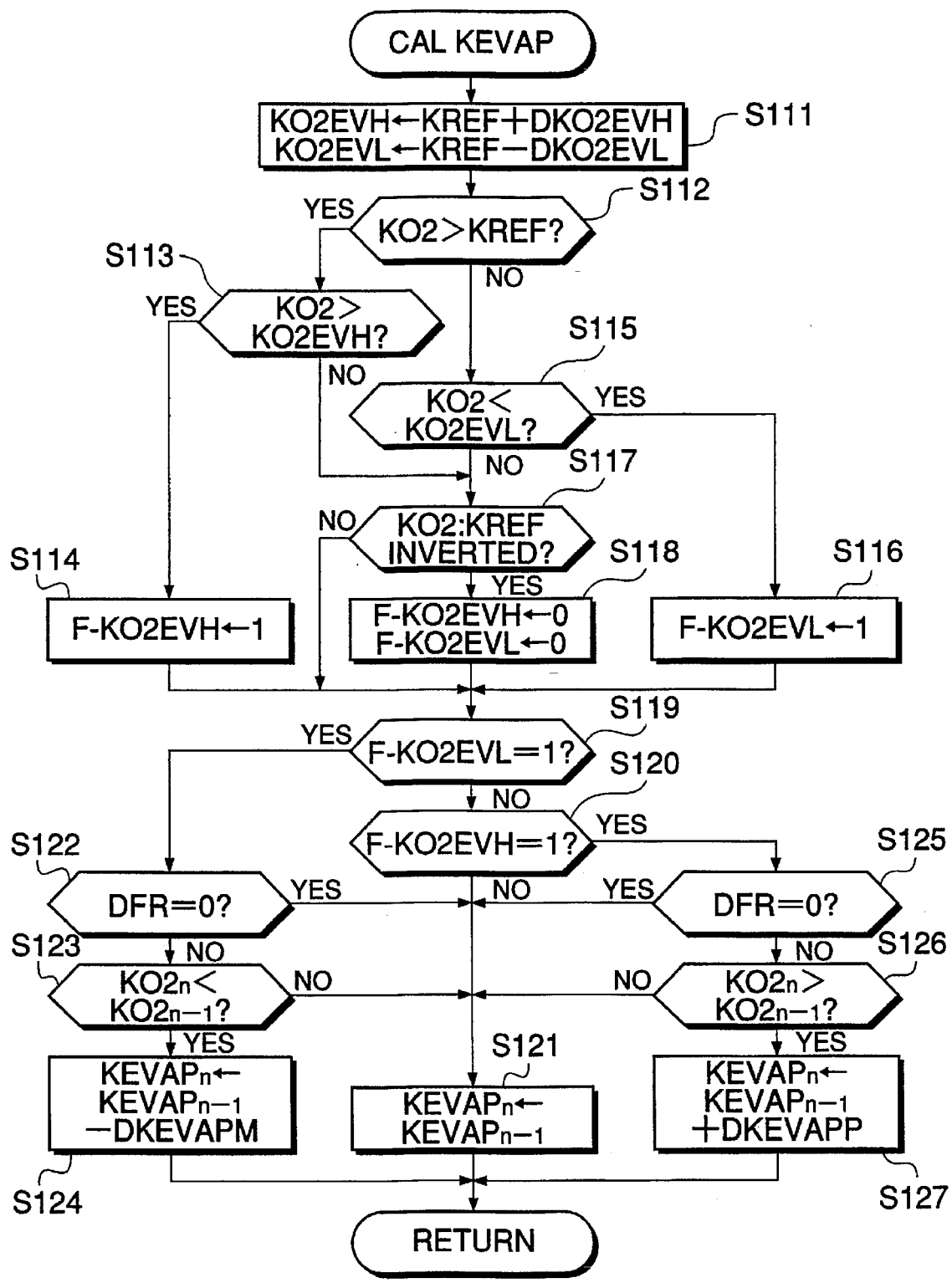
FIG. 6 is a flowchart of a subroutine for calculating the evaporative fuel-dependent correction coefficient KEVAP.

FIG. 5 shows a main routine for calculating the evaporative fuel-dependent correction coefficient KEVAP. This routine is executed in synchronism with interrupt timing based on each TDC signal pulse. First at a step S81, it is determined whether or not the engine is in the starting mode. If the answer to this question is affirmative (YES), it is judged that there is no influence of the purge on the air-fuel ratio control, and hence the evaporative fuel-dependent correction coefficient KEVAP is set to 1.0, and a learned value KEVAPREF thereof is set to 1.0 at a step S83, followed by terminating the routine.

When the engine has left the starting mode, the program proceeds to a step S84, where it is determined whether or not the flag F-FR is equal to 1 in the present loop. If the answer to this question is negative (NO), i.e. if purging is not permitted for the present loop, the program proceeds to a step S85, whereas if the answer is affirmative (YES), i.e. if purging is permitted, the program proceeds to a step S92.

At the step S85, a flag F-KO2EVH and a flag F-KO2EVL are set to "0", and then it is determined at a step S86 whether or not purging was permitted in the immediately preceding loop. If purging was permitted in the immediately preceding loop, the program proceeds to a step S87, where the learned value KEVAPREF of the evaporative fuel-dependent correction coefficient KEVAP is set to the immediately preceding value KEVAPn−1.

If purging was not permitted in the immediately preceding loop either, the program proceeds from the step S86 to a step S88 without changing the learned value KEVAPREF.

That is, the learned value KEVAPREF is set to 1.0 (at the step S81) when the engine is in the staring mode, or to a value assumed immediately before purging starts to be inhibited.

At the step S88, a timer tmEVDEC is set, and at the following step S89, it is determined whether or not the count value of a timer tmEVADD is equal to 0.

The count value of the timer tmEVDEC is used at a step S98, referred to hereinafter, which is carried out when purging is permitted, while the timer tmEVADD is set to a predetermined time period when a step S93 is carried or alternatively it is set to 0 when a step S94 is carried out.

If the count value of the timer tmEVADD is equal to 0 at the step S89, the program proceeds to a step S90, where the present value KEVAPn of the value KEVAP is set to the immediately preceding value KEVAPn−1 thereof to hold the correction coefficient. When the count value of the timer tmEVADD is equal to 0, the program proceeds to a step S91, where an incremental value DKEADD is added to the immediately preceding value KEVAPn−1 to set the present value KEVAPn, thereby stepwise increasing the correction coefficient KEVAP.

That is, when the timer tmEVADD has been set to the predetermined time period in advance, and then purging is inhibited, the evaporative fuel-dependent correction coefficient KEVAP is held to the immediately preceding value (at the step S90) until the count value of the timer tmEVADD becomes equal to 0 to thereby continue the purge-dependent correction of the fuel injection amount. After the timer tmEVADD becomes equal to 0, the evaporative fuel-dependent correction coefficient KEVAP is stepwise increased (at the step S91) until it becomes equal to 1, whereupon it is considered that there is no influence of the purge on the air-fuel ratio.

This takes into consideration the influence of evaporative fuel remaining within the purging passage 23 immediately after the purge cut is started.

More specifically, immediately after the purge cut is started, the air-fuel ratio does tom become lean instantly due to evaporative fuel remaining within the purging passage 23, so that the evaporative fuel-dependent correction coefficient KEVAP, which is adapted to be set in response to the output from the O2 sensor, is set to a fixed value, i.e. held to the immediately preceding value for the predetermined time period. Thereafter, the correction coefficient KEVAP is progressively increased to make the evaporative fuel-dependent correction of the fuel injection amount to thereby prevent the air-fuel ratio from being suddenly changed.

From the step S90 or S91, the program proceeds to a step S103.

On the other hand, if it is determined at the step S84 purging is permitted or continues to be permitted, the program proceeds to a step S92, where it is determined whether or not the evaporative fuel-dependent correction coefficient KEVAP is larger than a predetermined value KEVADD, i.e. whether or not the influence of the purge on the air-fuel ratio is considered to be great.

When the purged amount of evaporative fuel is large and hence the influence of the purge on the air-fuel ratio is great (KEVAP≦KEVADD), the program proceeds to the aforementioned step S93, where the timer tm EVADD is set, whereas if the influence of the purge is small (KEVAP>KEVADD), the program proceeds to the aforementioned step S94, where the timer tmEVADD is set to 0, followed by the program proceeding to a step S95.

The count value of the timer tmEVADD is for use at the aforementioned step S89.

While the influence of the purge on the air-fuel ratio is small, the timer tmEVADD is set to 0, whereby the evaporative fuel-dependent correction coefficient KEVAP immediately starts to be progressively increased to thereby enable the air-fuel ratio control to follow up operating conditions of the engine.

Then, at the step S95, it is determined whether or not the learned value KEVAPREF of the correction coefficient KEVAP is smaller than 1.0. If the answer to this question is negative (NO), i.e. if the learned value KEVAPREF is equal to 1.0, the program proceeds to a step S96, where the evaporative fuel-dependent correction coefficient KEVAP is calculated, whereas if the answer is affirmative (YES), the program proceeds to a step s97, where it is determined whether or not the flag F-FRADD is equal to 1, i.e. whether the purging is at its early stage. If the answer is negative (NO), the program proceeds to the step S96, whereas if the answer is affirmative (YES), the program proceeds to the aforementioned step S98.

At the step S98, it is determined whether or not the count value of the timer tmEVDEC is equal to 0. Before the count value of the timer tmEVDEC becomes equal to 0, the program proceeds to a step S99, where the evaporative fuel-dependent correction coefficient KEVAP is held to the immediately preceding value KEVAPn−1. When the count value of the timer tmEVDEC is equal to 0, the program proceeds to a step S100, where a decremental value DKEVDEC is subtracted from the immediately preceding value KEVAPn−1 to set the present value KEVAPn, thereby stepwise decreasing the correction coefficient KEVAP.

From the step S99 or S100, the program proceed to a step S101, where it is determined whether or not the present value KEVAPn is larger than the learned value KEVAPREF. If the answer to this question is affirmative (YES), the program proceeds to the step S103 without correcting the present value KEVAPn, whereas if the answer is negative (NO), the present value KEVAPn is corrected to the learned value KEVAPREF at a step S102, followed by the program proceeding to the step S103.

That is, when the purging is resumed and is at its early stage after, the evaporative fuel-dependent correction coefficient KEVAP is set to the immediately preceding value KEVAPn−1 (initially set to 1.0) (at the step S99) before the count value of the timer tmEVDEC set at the step S88 becomes equal to 0, thereby inhibiting the purge-dependent correction of the fuel injection amount. After the count value of the timer tmEVDEC becomes equal to 0, the evaporative fuel-dependent correction coefficient KEVAP is stepwise decreased (at the step S100) to thereby progressively take the influence of the purge on the air-fuel ratio control into more account. The correction coefficient KEVAP continues to be reduced to the learned value KEVAPREF which was stored when purging was performed on the immediately occasion, whereupon, i.e. only after the lapse of a proper time period from the resumption of the purging, the purge-dependent correction of the fuel injection amount actually corresponding to the purged amount starts to be performed.

This takes into consideration the fact that immediately after the purging is resumed, no evaporative fuel stays within the purging passage 23, and therefore, only after the evaporative fuel flows from the purge control valve 24, which is opened, through the purging passage 23 to reach the intake pipe 2, the purged evaporative fuel has influence on air-fuel ratio of the mixture supplied to the engine. This delay in the control of the purged evaporative fuel is compensated for by the above procedures.

That is, before the delay time period (tmEVDEC) elapses, even if purging is performed, the air-fuel ratio does not change to a richer value according to a change in the purge amount. Therefore, the evaporative fuel-dependent correction coefficient KEVAP is set to a fixed value to prevent excessive correction of the fuel injection amount. Thereafter, the correction coefficient KEVAP is progressively decreased to make the evaporative fuel-dependent correction of the fuel injection amount to thereby prevent the air-fuel ratio from being suddenly changed.

FIG. 11a and FIG. 12b show changes in the evaporative fuel-dependent correction coefficient KEVAP occurring according to the FIG. 5 routine, with changes in the purge duty control amount DFR.

FIG. 11a shows changes in the evaporative fuel-dependent correction coefficient KEVAP occurring when the purging has ceased to be permitted. If the evaporative fuel-dependent correction coefficient KEVAP is smaller than the predetermined value KEVADD and hence the influence of the purge on the air-fuel ratio is great, before purging starts to be inhibited, as designated by the solid line, the timer tmEVADD is set (at the step S93), and when the purging has ceased to be permitted, the correction coefficient KEVAP is held (at the step S90) until the timer tmEVADD has counted up to thereby continue the purge-dependent correction of the fuel injection amount.

Evaporative fuel remaining in high concentration within the purging passage 23 immediately after the purge control valve is closed has a significant influence on the air-fuel ratio, and hence the evaporative fuel-dependent correction coefficient KEVAP is held to a value assumed immediately before the purging is stopped, to thereby continue the evaporative fuel-dependent correction of the fuel injection amount for the predetermined time period, for stability of the air-fuel ratio control.

Then, when there is no influence of the evaporative fuel on the air-fuel ratio after the lapse of the predetermined time period, the evaporative fuel-dependent correction coefficient KEVAP is progressively increased (at the step S91) to thereby secure stable responsiveness of the air-fuel ratio control.

In this connection, when the correction coefficient KEVAP is larger than the predetermined value KEVADD and hence the influence of the purge is small, as designated by the broken line, the timer tmEVADD is set to 0 (at the step S94), and hence the correction coefficient KEVAP is toe held but progressively increased immediately (at the step S90) after the purging starts to be inhibited, thereby preventing the correction of the fuel injection amount from being unnecessarily performed.

FIG. 12a shows changes in the evaporative fuel-dependent correction coefficient KEVAP when the purge is resumed as shown in FIG. 12b. While the purge cut is performed, the timer tmEVDEC is set (at the step S88), and after purging is permitted, the correction coefficient KEVAP is held to 1.0 (at the step S99) until the timer tmEVDEC has counted up, to thereby inhibit the purge-dependent correction of the fuel injection amount before a predetermined time period elapses after resumption of the purging.

Thus, it is made possible to perform the air-fuel ratio control in a stable manner when the purging is resumed by inhibiting the purge-dependent correction of the fuel injection amount for the predetermined time period before evaporative fuel starts to affect the air-fuel ratio after flowing from the purge control valve 24, which is opened, through the purging passage 23 into the intake pipe 2.

After the Lapse of the predetermined time period, the purging starts to have a significant influence on the air-fuel ratio, and therefore, the evaporative fuel-dependent correction coefficient KEVAP is progressively decreased from 1.0 (at the step 100), until it reaches a value assumed when purging was performed on the last occasion, to thereby secure stable responsiveness of the air-fuel ratio control.

Next, the subroutine executed at the step S96 of the FIG. 5 routine for determining the evaporative fuel-dependent correction coefficient KEVAP will be described with reference to FIG. 6.

First, at a step S111, an incremental value DKO2EVH is added to the learned value KREF of the air-fuel ratio correction coefficient KO2 to set an upper limit value KO2EVH and a decremental value DKO2EVL is subtracted from the learned value KREF to set a lower limit value KO2EVL, so as to take the influence of the purge into account.

In this connection, the learned value KREF assumes various values dependent on operating conditions of the engine.

Then, at the following step S112, it is determined whether or not the air-fuel ratio correction coefficient KO2 is larger than the learned value KREF. If the former is larger the latter, it is further determined at a step S113 whether or not the correction coefficient KO2 is larger than the upper limit value KO2EVLH. If the answer to this question is affirmative (YES), a flag FKO2EVH is set to a value of 1 at a step S114, and then the program proceeds to a step S119, whereas if the answer is negative (NO), the program proceeds to a step S117.

On the other hand, if the correction coefficient KO2 is smaller than the learned value KREF, the program proceeds from the step S112 to a step S115, where it is further determined whether or not the correction coefficient KO2 is smaller than the lower limit value KO2EVL. If the answer to this question is affirmative (YES), a flag F-KO2EVL is set to a value of 1 at a step S116, and then the program proceeds to the step 119, whereas if the answer is negative (NO), the program proceeds to the step S117.

Under the condition of the correction coefficient KO2 falling between the upper limit value KO2EVH and the lower limit value KO2EVL, at the step S117, it is determined whether or not the correction coefficient KO2 is inverted with respect to the learned value KREF, i.e. whether the correction coefficient KO2 is changed across the learned value KREF. If the answer is affirmative (YES), the program proceeds to a step S118, where the flags F-KO2EVH and F-KO2EVL are set to "0", and then the program proceeds to the step S119, whereas if the answer is negative (NO), the program jumps over to the step S119.

Therefore, once the flags F-KO2EVH and F-KO2EVL are set to a value of 1, the flags are not set to "0" unless the correction coefficient KO2 is inverted with respect to the learned value KREF.

At the steps S119 and S120, it is determined whether or not the flag F-KO2EVH is equal to 1, and whether or not the flag F-KO2EVL is equal to 1, respectively. If both the answers to these questions are negative (NO), the program proceeds to a step S121, where the evaporative fuel-dependent correction coefficient KEVAP is held to the immediately preceding value KEVAPn−1 thereof.

That is, after the correction coefficient KO2 is inverted with respect to the learned value KREF and falls between the upper and lower limit values, the evaporative fuel-dependent correction coefficient KEVAP is held to the immediately preceding value.

When the correction coefficient KO2 becomes smaller than the lower limit value KO2EVL and accordingly the flag F-KO2EVL is set to "1", the program proceeds from the step S119 to a step S122, where it is determined whether or not the purge duty control amount DFR is equal to 0. If the answer to this question is affirmative (YES), the program proceeds to the step S121 to hold the correction coefficient KEVAP, whereas if the answer is negative (NO), i.e. if purging is being performed, the program proceeds to a step S123, where it is determined whether or not the present value KO2n of the air-fuel ratio correction coefficient KO2 is smaller than the immediately preceding value KO2n−1. If the answer to this question is affirmative (YES), i.e. if KO2n<KO2n−1, it means that the correction coefficient KO2 is being further decreased away from the learned value KEREF, and the program proceeds to a step S124, where a decremental value DKEVAPM is subtracted from the immediately preceding value KEVAPn−1 to set the present value KEVAPn, thereby reinforcing the purge-dependent correction of the fuel injection amount.

However, if the present value KO2n is equal to or larger than the immediately preceding value KO2n−1, and hence the correction coefficient KO2 is changing toward the learned value KREF, the program jumps from the step S123 to the step S121, where the evaporative fuel-dependent correction coefficient KEVAP is held to the immediately preceding value KEVAPn−1.

Than is, when the correction coefficient KO2 is changing toward the learned value KREF (in a restoring direction), the purge-dependent correction of the fuel injection amount is prevented from being performed more than required to secure stability of the air-fuel ratio control.

Similarly, when the flag F-KO2EVH is equal to "1", i.e. when the program proceeds from the step S120 to the step S125, it is determined whether or not the purge duty control amount DFR is equal to "0". If the answer to this question is affirmative (YES), the program jumps over to the step S121, whereas if the answer is negative (NO), the program proceeds to a step S126, where it is determined whether or not the present value KO2n is larger than the immediately preceding value KO2n−1. If the answer to this question is affirmative (YES), i.e. if the correction coefficient KO2 is changing away from the learned value KREF, the program proceeds to a step S127, where an incremental value DKEVAPP is added to the immediately preceding value KEVAPn−1 to set the present value KEVAPn, thereby reinforcing the purge-dependent correction of the fuel infection amount, whereas if the answer is negative (NO), i.e. the correction coefficient KO2 is changing toward the learned value KREF, the program proceeds to the step S121 to hold the evaporative fuel-dependent correction coefficient KEVAP, thereby preventing the purge-dependent correction of the fuel injection amount from being performed more than required.

Figures 13A, 13B:
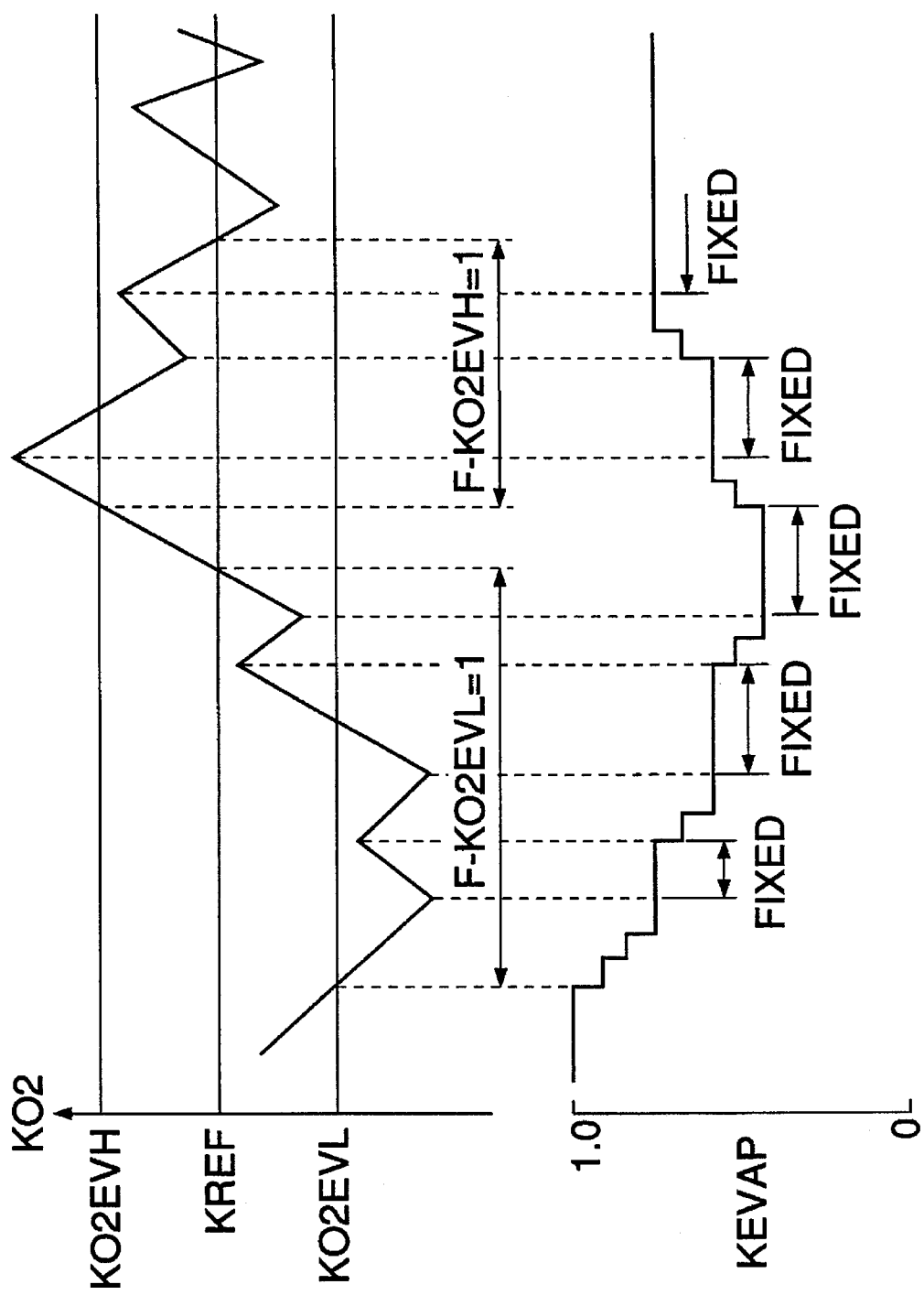

FIG. 13b shows changes in the evaporative fuel-dependent correction coefficient KEVAP depicted in relation to changes in the air-fuel ratio correction coefficient KO2 shown in FIG. 13a. Assuming that the purging is resumed and at the same time correction coefficient KO2 is decreasing, when the correction coefficient KO2 becomes smaller than the lower limit value KO2EVL, the flag F-KO2EVL is set to 1 (at the step S116), thereby progressively decreasing the evaporative fuel-dependent correction coefficient KEVAP (at the step S124).

However, when the correction coefficient is increasing toward the learned value KREF, the evaporative fuel-dependent correction coefficient KEVAP is held to the immediately preceding value (at the step S121).

Further, when the correction coefficient exceeds the learned value KREF to be inverted with respect thereto, the flag F-KO2EVL is set to "0" (at the step S118). When the correction coefficient KO2 is further increased to exceed the upper limit value KO2EVH, and accordingly the flag F-KO2EVH is set to "1" (at the step S114), the evaporative fuel-dependent correction coefficient KEVAP is progressively increased (at the step S127).

When the flag F-KO2EVH is equal to "1" and at the same time the correction coefficient KO2 is decreasing toward the learned value KREF, the evaporative fuel-dependent correction coefficient KEVAP is held to the immediately preceding value (at the step S121).

In this manner, when the correction coefficient KO2 is changing toward the learned value KREF (in a restoring direction), the purge-dependent correction of the fuel injection amount is prevented from being performed more than required to secure stability of the air-fuel ratio control.

When the first correction coefficient KO2 is being decreased dieting the purging, it means that the concentration of purged evaporative fuel is high, and hence the air-fuel mixture is enriched, i.e. the air-fuel ratio is decreased. Therefore, the second correction coefficient (evaporative fuel-dependent correction coefficient) KEVAP is decreased to prevent the mixture from being made overrich.

On the other hand, when first correction coefficient KO2 is being increased during the purging, it means that the concentration of purged evaporative fuel is low, and hence the mixture cannot be made overrich. Therefore, the evaporative fuel-dependent correction coefficient KEVAP is increased to enhance the responsiveness of the air-fuel ratio control.

Figure 7:
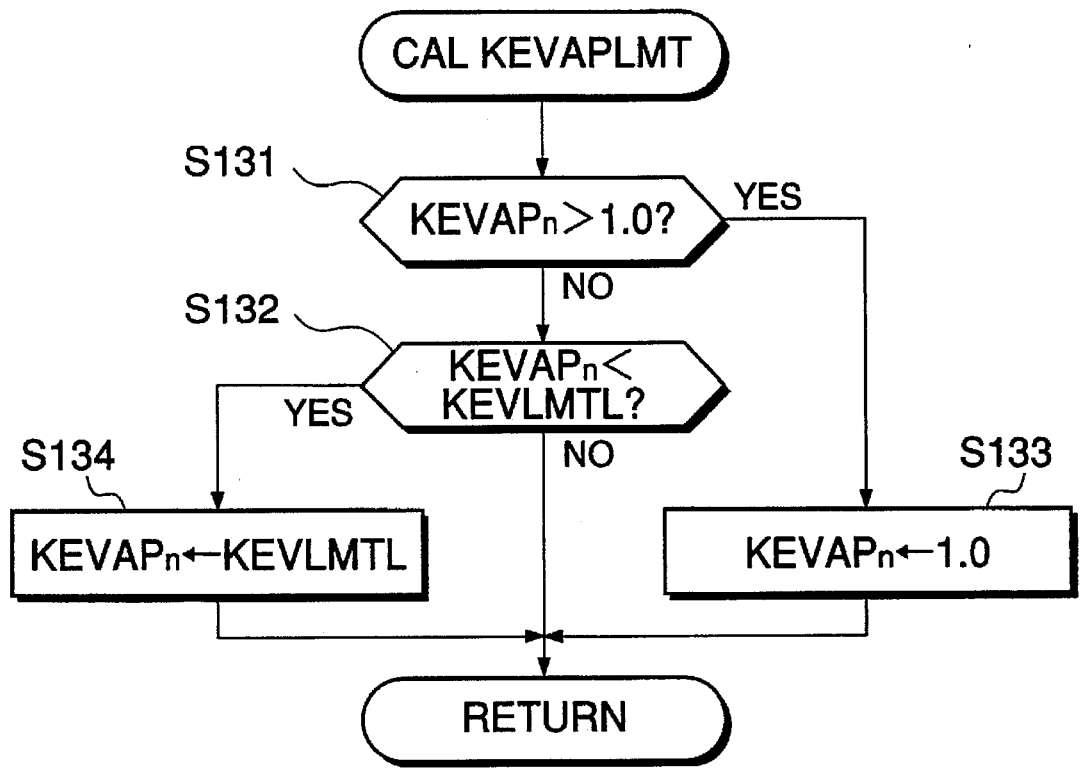
FIG. 7 is a flowchart of a subroutine for determining upper and lower limit values of the evaporative fuel-dependent correction coefficient KEVAP.

In addition, a manner of setting upper and the Lower limit values off the evaporative fuel-dependent correction coefficient KEVAP at the step S103 of the FIG. 5 routine will be described with reference to FIG. 7 showing a subroutine therefore.

First, it is determined at a step S131 whether or not the present value KEVAPn of the evaporative fuel-dependent correction coefficient KEVAP is larger than 1.0. If the answer to this question is affirmative (YES), the program proceeds to a step S133, where the present value KEVPn is set to the upper limit value of 1.0, whereas if the answer to this question is negative (NO), it is determined at a step S132 whether or not the present value KEVAPn is smaller than a predetermined lower limit value KEVLMTL. If the answer to this question is affirmative (YES), the program proceeds to a step S134, where the evaporative fuel-dependent is set to the predetermined lower limit value Thus, the upper and lower limit values of the evaporative fuel-dependents are set.

Although the evaporative fuel-dependent correction coefficient KEVAP is determined according to the air-fuel ratio correction coefficient KO2 in the present embodiment, this is not limitative, but a concentration sensor may be provided in the purging passage for directly detecting the concentration of evaporative fuel therein, to thereby correct the fuel injection amount based on an output from the concentration sensor.

What is claimed is:

1. In a control system for an internal combustion engine having an intake passage, a fuel tank, a canister for adsorbing evaporative fuel generated from said fuel tank, and a purging passage connecting said canister and said intake passage for allowing said evaporative fuel to be purged therethrough into said intake passage, said engine being installed on an automotive vehicle, said control system including a purge control valve arranged in said purging passage for controlling a flow rate of said evaporative fuel purged through said purging passage into said intake passage, operating condition-detecting means for detecting operating conditions of said engine, first purging control amount-determining means for determining a first purging control amount (DFR) based on said operating conditions of said engine detected by said operating condition-detecting means, and purging flow rate-controlling means for controlling said purge control valve depending on said first purging control amount, the improvement comprising:
starting parameter-detecting means for detecting a parameter related to a standing start of said vehicle;
vehicle start-dependent purging control amount-calculating means for calculating a second purging control amount (DFRX) based on said parameter related to said standing start of said vehicle such that said second purging control amount is progressively increased; and
vehicle start-dependent purging flow rate-controlling means for controlling, said purge control valve based said second purging control amount when said vehicle performs said standing start.

2. A control system according to claim 1, wherein said vehicle start-dependent purging flow rate-controlling means holds said second purging control amount to a predetermined value for a predetermined time period after said vehicle has started to perform said standing start, and thereafter permits said vehicle start-dependent purging control amount-calculating means to progressively increase said second purging control amount by a predetermined incremental value.

3. A control system according to claim 1, wherein said vehicle start-dependent purging flow rate-controlling means permits said vehicle start-dependent purging control amount-calculating means to progressively increase said second purging control amount until said second purging control becomes equal to said first purging control amount.

* * * * *